US010880603B2

(12) United States Patent
Deshpande

(10) Patent No.: US 10,880,603 B2
(45) Date of Patent: *Dec. 29, 2020

(54) METHOD FOR PROVIDING A CONSUMPTION DATA MESSAGE

(71) Applicant: Sharp Kabushiki Kaisha, Sakai (JP)

(72) Inventor: Sachin G. Deshpande, Camas, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/251,346

(22) Filed: Jan. 18, 2019

(65) Prior Publication Data
US 2019/0158917 A1 May 23, 2019

Related U.S. Application Data

(63) Continuation of application No. 15/772,823, filed as application No. PCT/JP2016/082980 on Nov. 7, 2016, now Pat. No. 10,271,100.
(Continued)

(51) Int. Cl.
H04N 21/442 (2011.01)
H04N 21/41 (2011.01)
(Continued)

(52) U.S. Cl.
CPC ..... H04N 21/44222 (2013.01); G06Q 50/265 (2013.01); H04N 17/00 (2013.01);
(Continued)

(58) Field of Classification Search
CPC ............. H04N 21/44222; H04N 17/00; H04N 21/6582; H04N 21/4126; H04N 21/4307;
(Continued)

(56) References Cited

U.S. PATENT DOCUMENTS 6,466,971 B1* 10/2002 Humpleman ....... H04L 12/2803
709/203
2014/0108542 A1* 4/2014 Cheng .................. H04L 65/403
709/204
2018/0247520 A1* 8/2018 Yamane .................. G06F 13/00

OTHER PUBLICATIONS

Deshpande, "System for Device Information Reporting", U.S. Appl. No. 15/772,823, filed May 2, 2018.

* cited by examiner

Primary Examiner — Kunal Langhnoja
(74) Attorney, Agent, or Firm — Keating & Bennett, LLP

(57) ABSTRACT

A method for providing a consumption device message from a consumption device that includes a processor to a service usage data server comprising: (a) providing by said processor of said consumption device said consumption device message from said consumption device to said service usage data server that includes: (i) a deviceInfo element that describes information of said consumption device; (ii) a deviceID field of said deviceInfo element that describes an identifier of said consumption device; (iii) a deviceModel field of said deviceInfo element that describes a model of said consumption device; (iv) a deviceManufacturer field of said deviceInfo element that describes a manufacturer of said consumption device; (v) a deviceOS field of said deviceInfo element that describes both an operating system and version of said operating system of said consumption device; (vi) a peripheralDevice field of said deviceInfo element that describes whether said consumption device is an external peripheral; (b) wherein said deviceID field has a selected value to indicate said identifier of said consumption device is intentionally not revealed; (c) wherein said deviceModel field has said selected value to indicate said model of said consumption device is intentionally not revealed; (d) wherein said deviceManufacturer field has said selected value to indicate said manufacturer of said consumption
(Continued)

device is intentionally not revealed; (e) wherein said deviceOS field has said selected value to indicate said operating system of said consumption device is intentionally not revealed; (f) wherein said peripheralDevice field has said selected value to indicate said whether said consumption device is said external peripheral is intentionally not revealed.

2 Claims, 34 Drawing Sheets

Related U.S. Application Data

(60) Provisional application No. 62/253,011, filed on Nov. 9, 2015.

(51) Int. Cl.
*H04N 21/426* (2011.01)
*H04N 21/43* (2011.01)
*H04N 21/45* (2011.01)
*H04N 21/658* (2011.01)
*G06Q 50/26* (2012.01)
*H04N 17/00* (2006.01)

(52) U.S. Cl.
CPC ... *H04N 21/4126* (2013.01); *H04N 21/42684* (2013.01); *H04N 21/4307* (2013.01); *H04N 21/4516* (2013.01); *H04N 21/6582* (2013.01)

(58) Field of Classification Search
CPC ......... H04N 21/42684; H04N 21/4516; G06Q 50/265
See application file for complete search history.

[Fig. 1]
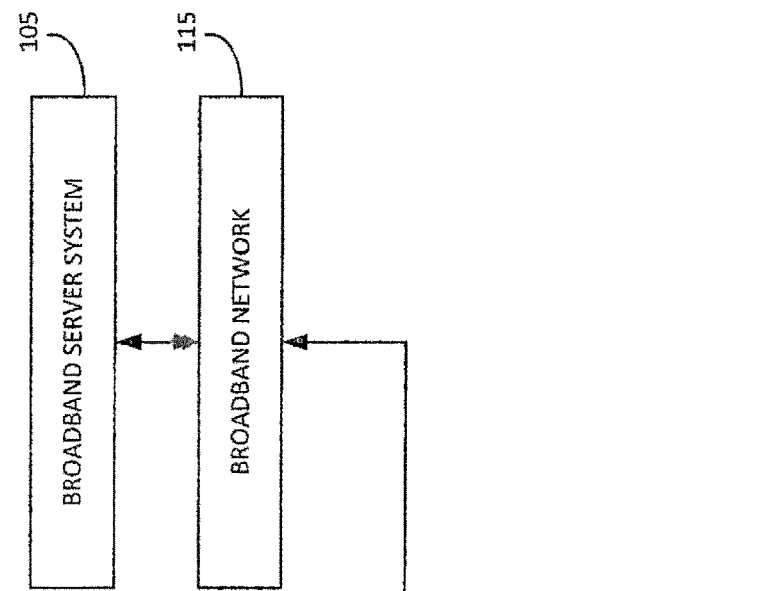
[Fig. 2]
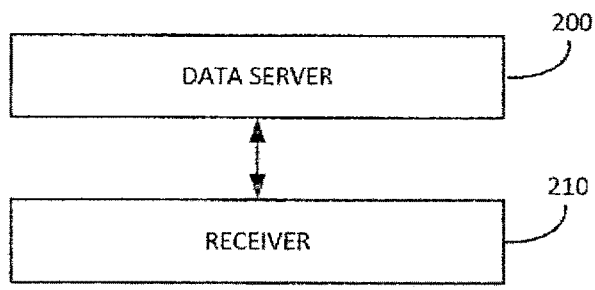

[Fig. 3]
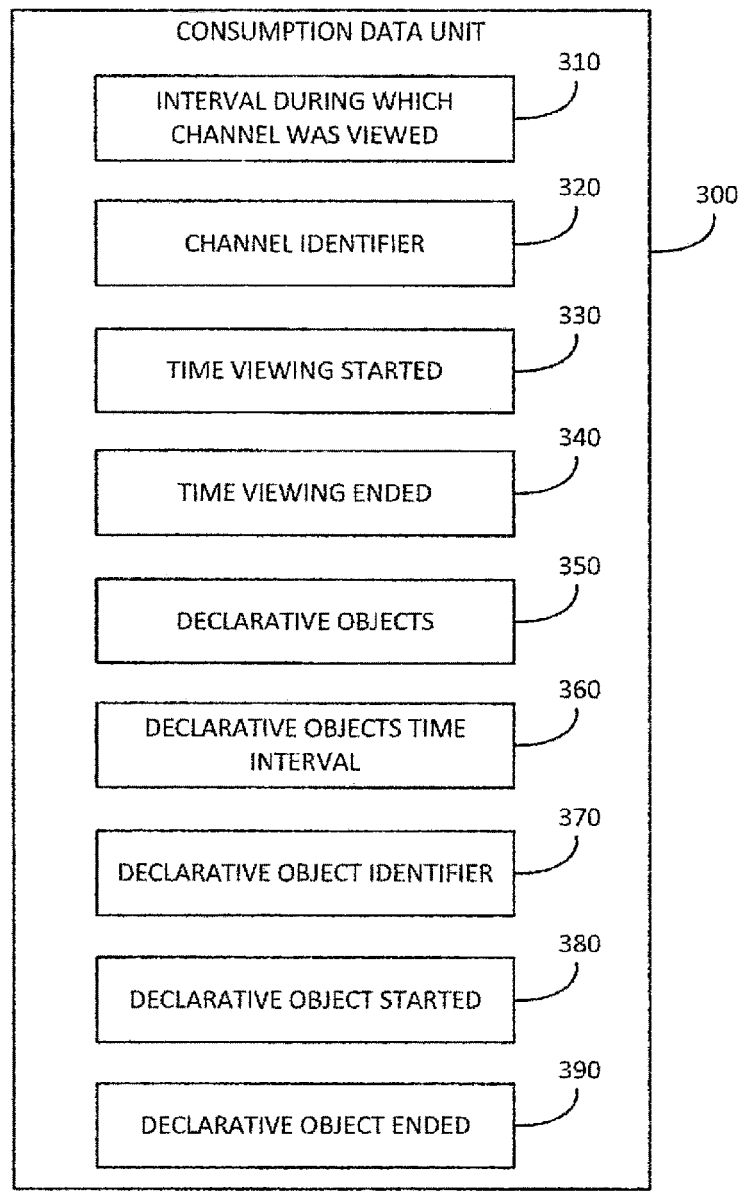

[Fig. 4]
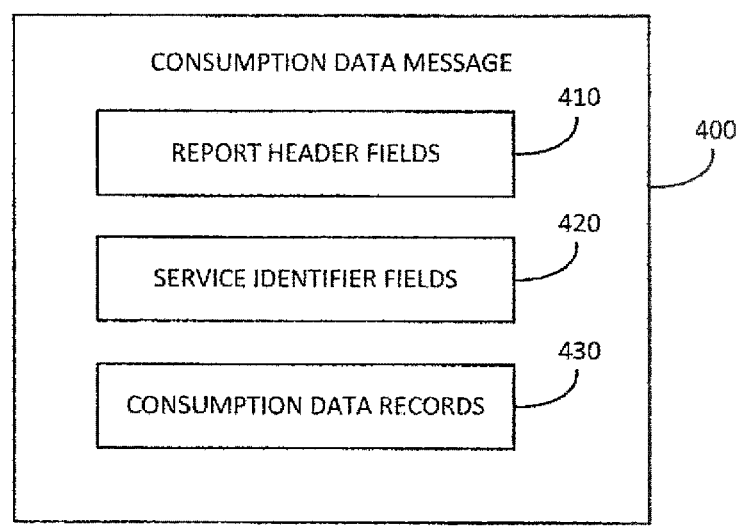

| Element (or Attribute with @) | Cardinality | Data Type | Description |
|---|---|---|---|
| CDM | | | Consumption Data Message |
| @protocolVersion | 1 | hexBinary | Major Version of CDM protocol |
| AVChannel | 0..N | | |
| @channelNum | 1 | hexBinary | Virtual Channel number |
| @serviceType | 1 | unsignedByte | E.g., Television, Audio only. Parameterized |
| ViewInterval | 1..N | | Virtual channel viewing interval |
| @startTime | 1 | dateTime | Start time of interval |
| @endTime | 1 | dateTime | End time of interval |
| @usageType | 1 | int | Full screen, PIP, etc. |
| @timeShift | 1 | boolean | |
| @viewStartTime | 0..1 | dateTime | |
| @viewEndTime | 0..1 | dateTime | |
| DOInterval | 0..N | | Interval of active TDO |
| @doId | 1 | string | DO ID |
| @startTime | 1 | dateTime | Start time of interval |
| @endTime | 1 | dateTime | End time of interval |
| NRTService | 0..N | | NRT service selection interval |
| @serviceID | 1 | hexBinary | |
| NRTInterval | 1..N | | |
| @startTime | 1 | dateTime | Start time of interval |
| @endTime | 1 | dateTime | End time of interval |
| NRTItem | 0..N | | Content item usage interval |
| @contentItemId | 1 | string | Content item content linkage |
| @startTime | 1 | dateTime | Start time of interval |
| @endTime | 1 | dateTime | End time of interval |

FIG. 5

| Element (or Attribute with @) | Cardinality | Data Type | Description |
|---|---|---|---|
| Component | | | Individual content components within a given channel |
| @componentType | 1 | unsignedByte | Type of the component (e.g. audio, video, closed caption, etc.) |
| @componentRole | 1 | string | Role of the component. |
| @componentName | 0..1 | string | Human readable name of the component |
| @componentID | 1 | string | Component ID |
| @startTime | 1 | dateTime | Start time of the interval when content component is presented |
| @endTime | 1 | dateTime | End time of the interval when content component is presented |

FIG. 6

| Element (or Attribute with @) | Cardinality | Data Type | Description |
|---|---|---|---|
| @deviceType | 1 | boolean | Device type on which content is presented |

FIG. 8

| Element (or Attribute with @) | Cardinality | Data Type | Description |
|---|---|---|---|
| @deviceType | 1 | unsignedByte | Device type on which content is presented |

FIG. 9

| Element (or Attribute with @) | Cardinality | Data Type | Description |
|---|---|---|---|
| DeviceType | | | Device type for the content presentation |
| @dev | 0..N | unsignedByte | Device type on which content is presented |
| @startTime | 1 | datetime | Start time of the interval when content is presented on the device |
| @endTime | 1 | dateTime | End time of the interval when content is presented on the device |

FIG. 10

| Element (or Attribute with @) | Cardinality | Data Type | Description |
|---|---|---|---|
| @deliveryPath | 1 | boolean | Type of deliver/distribution path used for the content being consumed |

FIG. 11

| Element (or Attribute with @) | Cardinality | Data Type | Description |
|---|---|---|---|
| @deliveryPath | 1 | unsignedByte | Type of deliver/distribution path used for the content being consumed |

FIG. 12

| Element (or Attribute with @) | Cardinality | Data Type | Description |
|---|---|---|---|
| DeliveryPath | 0..N | | Delivery path used for the content |
| @pathType | 1 | unsignedByte | Type of delivery/distribution path used for the content being consumed |
| @startTime | 1 | datetime | Start time of the interval when content is received via delivery path indicated by pathType |
| @endTime | 1 | dateTime | End time of the interval when content is received via delivery path indicated by pathType |

FIG. 13

| Element (or Attribute with @) | Cardinality | Data Type | Description |
|---|---|---|---|
| Component | 0..N | | Individual Content components within a given channel |
| @componentType | 1 | unsignedByte | Type of the component (e.g. audio, video, closed caption, etc.) |
| @componentRole | 1 | string | Role of the component |
| @componentName | 0..1 | string | Human readable name of the component |
| @componentID | 1 | string | Component ID |
| @startTime | 1 | dateTime | Start time of the interval when content component is presented |
| @endTime | 1 | dateTime | End time of the interval when content component is presented |
| DeliveryPath | 0..N | | Delivery path used for the content component being consumed |
| @pathType | 1 | string | Type of delivery/distribution path used for the content component being consumed |
| @startTime | 1 | dateTime | Start time of the interval when content component is received via delivery path indicated by pathType |
| @endTime | 1 | dateTime | End time of the interval when content component is received via delivery path indicated by pathType |

FIG. 14

| Element (or Attribute with @) | Cardinality | Data Type | Description |
|---|---|---|---|
| CDM | 1 | | Consumption Data Message |
|   @protocolVersion | 1 | hexBinary | Major Version of CDM protocol |
|   AVChannel | 1..N | | |
|     @channelNum | 1 | hexBinary | Virtual Channel number |
|     @serviceType | 1 | unsignedByte | e.g., Television, Audio only. Parameterized |
|     ViewInterval | 1..N | | Virtual channel viewing interval |
|       @startTime | 1 | dateTime | Start time of interval |
|       @endTime | 1 | dateTime | End time of interval |
|       @usageType | 1 | int | Full screen, PIP, etc. |
|       @timeShift | 1 | boolean | |
|       @viewStartTime | 0..1 | dateTime | |
|       @viewEndTime | 0..1 | dateTime | |
|       @deviceType | 1 | unsignedByte | Device type on which content is presented. |
|       Component | 1..N | | Individual content components within a given channel |
|         @componentType | 1 | unsignedByte | Type of the component (e.g. audio, video, closed caption, etc.) |
|         @componentRole | 1 | unsignedByte | Role of the component |
|         @componentName | 0..1 | string | Human readable name of the component |
|         @componentID | 1 | string | Component ID |
|         @startTime | 1 | dateTime | Start time of the interval when content component is presented |
|         @endTime | 1 | dateTime | End time of the interval when content component is presented |
|         DeliveryPath | 1..N | | Delivery path used for the content component being consumed |
|           @pathType | 1 | unsignedByte | Type of delivery path used for the content component being consumed |
|           @startTime | 1 | dateTime | Start time of the interval when content component is received via delivery path indicated by pathType |
|           @endTime | 1 | dateTime | End time of the interval when content component is received via delivery path indicated by pathType |
|       DOInterval | 0..N | | Interval of active TDO |
|         @doId | 1 | string | DO ID |
|         @startTime | 1 | dateTime | Start time of interval |
|         @endTime | 1 | dateTime | End time of interval |
|   NRTService | 0..N | | NRT service selection interval |
|     @serviceID | 1 | hexBinary | |
|     NRTInterval | 1..N | | |
|       @startTime | 1 | dateTime | Start time of interval |
|       @endTime | 1 | dateTime | End time of interval |
|       NRTItem | 0..N | | Content item usage interval |
|         @contentItemId | 1 | string | Content item content linkage |
|         @startTime | 1 | dateTime | Start time of interval |
|         @endTime | 1 | dateTime | End time of interval |

FIG. 15

```
{
    "id": "http://atsc.org/version/3.0/serviceusagereporting/usagereport#",
    "$schema": "http://json-schema.org/draft-04/schema#",
    "title": "ATSC 3.0 Service Usage Report Consumption Data Message",
    "description": "Service Usage Report Consumption Data Message Schema
as defined in ATSC 3.0 (c) 2015 atsc.org - All rights reserved.",
    "type": "object",
    "properties": {
    "required": ["ConsumptionDataMessage"],
    "ConsumptionDataMessage": {
       "type": "object",
       "properties": {
         "protocolVersion": {
            "type": "number"
         },
         "AVChannel": {
            "type": "object",
            "properties": {
              "channelNum": {
                 "type": "integer"
              },
              "serviceType": {
                 "type": "integer"
              },
              "viewInterval": {
                 "type": "object",
                 "properties": {
                   "startTime": {
                      "type": "string",
                      "format" : "date-time"
                   },
                   "endTime": {
                      "type": "string",
                      "format" : "date-time"
                   },
                   "usageType": {
                      "type": "integer"
                   },
                   "timeShift": {
                      "type": "boolean"
                   },
                   "viewStartTime": {
                      "type": "string",
                      "format" : "date-time"
                   },
```

FIG.16A

```
"viewEndTime": {
  "type": "string",
  "format" : "date-time"
},
"deviceType": {
  "type": "integer",
  "minimum": 0,
  "maximum": 255
},
"Component": {
    "type": "object",
    "properties": {
      "componentType": {
          "type": "integer",
          "minimum": 0,
          "maximum": 255
      },
      "componentRole": {
          "type": "integer",
          "minimum": 0,
          "maximum": 255
      },
      "componentName": {
        "type": "string"
      },
      "componentID": {
        "type": "string"
      },
      "startTime": {
        "type": "string",
        "format" : "date-time"
      },
      "endTime": {
        "type": "string",
        "format" : "date-time"
      },
      "DeliveryPath": {
        "type": "object",
        "properties": {
          "pathType": {
              "type": "integer",
              "minimum": 0,
              "maximum": 255
          },
          "startTime": {
              "type": "string",
```

FIG.16B

```
                                "format" : "date-time"
                            },
                            "endTime": {
                                "type": "string",
                                "format" : "date-time"
                            }
                        },
                        "required": ["pathType","startTime","endTime"]
                    }
                },
                "required":
["componentType","componentRole","componentID","startTime","endTime","DeliveryPath"]
            },
            "DOInterval": {
                "type": "object",
                "properties": {
                    "doId": {
                        "type": "string"
                    },
                    "startTime": {
                        "type": "string",
                        "format" : "date-time"
                    },
                    "endTime": {
                        "type": "string",
                        "format" : "date-time"
                    }
                },
                "required": ["doId","startTime","endTime"]
            }
        },
        "required":
["startTime","endTime","usageType","timeShift","deviceType","Component"]
        },
            "required": ["channelNum","serviceType","viewInterval"]
        }
    },
    "NRTService": {
        "type": "object",
        "properties": {
            "serviceID": {
                "type": "number"
            },
            "NRTInterval": {
                "type": "object",
```

FIG.16C

```
            "properties": {
               "startTime": {
                  "type": "string",
                  "format" : "date-time"
               },
               "endTime": {
                  "type": "string",
                  "format" : "date-time"
               },
               "NRTItem": {
                   "type": "object",
                   "properties": {
                      "contentItemId": {
                         "type": "string"
                      },
                      "startTime": {
                         "type": "string",
                         "format" : "date-time"
                      },
                      "endTime": {
                         "type": "string",
                         "format" : "date-time"
                      }
                   },
                   "required": ["contentItemId","startTime","endTime"]
                }
             },
             "required": ["startTime","endTime"]
          },
          "required": ["serviceID","NRTInterval"]
       }
    },
    "required": ["protocolVersion","AVChannel"],
    "additionalProperties": false }
 },
 "maxProperties": 1
}
  }
```

FIG. 16D

```
<element name="Component" minOccurs="0" maxOccurs="unbounded">
                        <complexType>
                         <sequence>
                         <element name="DeliveryPath" minOccurs="0" maxOccurs="unbounded">
                                        <complexType>
                                            <attribute name="pathType" type="unsignedByte" use="required"/>
                                            <attribute name="startTime" type="dateTime" use="required"/>
                                            <attribute name="endTime" type="dateTime" use="required"/>
                                        </complexType>
                                </element>
                                </sequence>
                                <attribute name="componentType" type="unsignedByte" use="required"/>
                                <attribute name="componentRole" type="string" use="required"/>
                                <attribute name="componentName" type="string" use="optional"/>
                                <attribute name="componentID" type="string" use="required"/>
                                <attribute name="startTime" type="dateTime" use="required"/>
                                <attribute name="endTime" type="dateTime" use="required"/>
                        </complexType>
                        </element>
```

FIG. 17

```
<?xml version="1.0" encoding="UTF-8"?>
<schema xmlns="http://www.w3.org/2001/XMLSchema"
    xmlns:pdi="http://www.atsc.org/XMLSchemas/atsc3-cdm-1"
    targetNamespace="http://www.atsc.org/XMLSchemas/atsc3-cdm-1"
    elementFormDefault="qualified"
    version="1.0">

<annotation>
        <documentation
source="http://www.atsc.org/cms/standards/cs_documents/A105-
CS.zip">
            ATSC 3.0 CDM (Consumption Data Message) schema Namespace: http://www.atsc.org/XMLSchemas/atsc3-cdm-1
            Information about the use of this schema can be found
in ATSC standard ATSC - Service Usage Reporting.
            This schema defines a "CDM" element that is used to
deliver consumption data messages (service usage reports) to a
remote server.
        </documentation>
    </annotation>

<complexType name="CDM">
        <sequence>
            <element name="AVChannel" minOccurs="0"
maxOccurs="unbounded">
                <complexType>
                    <sequence>
                        <element name="ViewInterval" minOccurs="1"
maxOccurs="unbounded">
                            <complexType>
                                <sequence>
                                    <element name="Component" minOccurs="0"
maxOccurs="unbounded">
                                        <complexType>
                                            <sequence>
                                                <element name="DeliveryPath"
minOccurs="0" maxOccurs="unbounded">
                                                    <complexType>
                                                        <attribute name="pathType"
type="unsignedByte" use="required"/>
                                                        <attribute name="startTime"
type="dateTime" use="required"/>
                                                        <attribute name="endTime"
type="dateTime" use="required"/>
                                                    </complexType>
                                                </element>
                                            </sequence>
                                            <attribute name="componentType"
type="unsignedByte" use="required"/>
```

FIG.18A

```
                            <attribute name="componentRole"
type="string" use="required"/>
                            <attribute name="componentName"
type="string" use="optional"/>
                            <attribute name="componentID"
type="string" use="required"/>
                            <attribute name="startTime"
type="dateTime" use="required"/>
                            <attribute name="endTime"
type="dateTime" use="required"/>
                          </complexType>
                        </element>
                    <element name="DOInterval" minOccurs="0"
maxOccurs="unbounded">
                          <complexType>
                            <attribute name="doId" type="string"
use="required"/>
                            <attribute name="startTime" type="dateTime"
use="required"/>
                            <attribute name="endTime" type="dateTime"
use="required"/>
                          </complexType>
                        </element>
                      </sequence>
                      <attribute name="startTime" type="dateTime"
use="required"/>
                      <attribute name="endTime" type="dateTime"
use="required"/>
                      <attribute name="viewStartTime" type="dateTime"
use="optional"/>
                      <attribute name="viewEndTime" type="dateTime"
use="optional"/>
                      <attribute name="usageType" type="int"
use="required"/>
                      <attribute name="timeShift" type="boolean"
use="optional" default="false"/>
                      <attribute name="deviceType" type="unsignedByte"
use="required"/>
                    </complexType>
                  </element>
                </sequence>
                <attribute name="channelNum" type="hexBinary"
use="required"/>
                <attribute name="serviceType" type="unsignedByte"
use="required"/>
            </complexType>
          </element>
        <element name="NRTService" minOccurs="0"
maxOccurs="unbounded">
            <complexType>
```

FIG.18B

```
            <sequence>
               <element name="NRTInterval" minOccurs="1"
maxOccurs="unbounded">
                  <complexType>
                    <sequence>
                      <element name="NRTItem" minOccurs="0"
maxOccurs="unbounded">
                         <complexType>
                           <attribute name="contentItemId"
type="string" use="required"/>
                           <attribute name="startTime" type="dateTime"
use="required"/>
                           <attribute name="endTime" type="dateTime"
use="required"/>
                         </complexType>
                      </element>
                    </sequence>
                    <attribute name="startTime" type="dateTime"
use="required"/>
                    <attribute name="endTime" type="dateTime"
use="required"/>
                  </complexType>
               </element>
            </sequence>
            <attribute name="serviceID" type="hexBinary"
use="required"/>
         </complexType>
      </element>
   </sequence>
   <attribute name="protocolVersion" type="hexBinary"
use="required"/>
  </complexType>
</schema>
```

FIG. 18C

| Element | Cardinality | Description |
| --- | --- | --- |
| DeviceInfo | 1 | Consumption Device information |
| deviceID | 1 | Consumption device identifier |
| deviceModel | 1 | Consumption device model |
| deviceManufacturer | 1 | Consumption device manufacturer |
| deviceOS | 1 | Consumption device Operating system and version |
| peripheralDevice | 1 | Indication if the consumption device is a peripheral device. |

FIG. 19

```
{
    "DeviceInfo": {
        "type": "array",
        "items": {
            "type": "object",
            "properties": {
                "deviceID": {"type": "string"},
                "deviceModel": {"type": "string"},
                "deviceManufacturer": {"type": "string"},
                "deviceOS": {"type": "string"},
                "peripheralDevice": {
                    "type": "string",
                    "enum": [
                        "TRUE",
                        "FALSE",
                        "PRIVATE"
                    ]
                }
            },
            "required": [
                "deviceID",
                "deviceModel",
                "deviceManufacturer",
                "deviceOS",
                "peripheralDevice"
            ]
        }
    },
    "minItems": 1,
    "maxItems": 1
}
```

FIG. 20

```xml
<?xml version="1.0" encoding="UTF-8"?>
<xs:schema xmlns:xs="http://www.w3.org/2001/XMLSchema"
    xmlns:vc="http://www.w3.org/2007/XMLSchema-versioning"
elementFormDefault="qualified"
    vc:minVersion="1.0" vc:maxVersion="1.1">

<xs:element name="DeviceInfo" minOccurs="0" maxOccurs="2">
        <xs:complexType>
            <xs:attribute name="deviceID" type="xs:string"
use="required"/>
            <xs:attribute name="deviceModel" type="xs:string"
use="required"/>
            <xs:attribute name="deviceManufacturer"
type="xs:string" use="required"/>
            <xs:attribute name="deviceOS" type="xs:string"
use="required"/>
            <xs:attribute name="peripheralDevice"
type="peripheralType" use="required"/>
        </xs:complexType>
    </xs:element>

<xs:simpleType name="peripheralType">
        <xs:restriction base="xs:string">
            <xs:enumeration value="TRUE" />
            <xs:enumeration value="FALSE" />
            <xs:enumeration value="PRIVATE" />
        </xs:restriction>
    </xs:simpleType>

</xs:schema>
```

FIG. 21

| Field | | | | | | Cardinality | Description |
|---|---|---|---|---|---|---|---|
| CDM | | | | | | 1 | Consumption Data Message |
| | protocolVersion | | | | | 1 | Major and minor version of CDM protocol |
| | DeviceInfo | | | | | 1 | Consumption Device information |
| | | deviceID | | | | 1 | Consumption device identifier |
| | | deviceModel | | | | 1 | Consumption device model |
| | | deviceManufacturer | | | | 1 | Consumption device manufacturer |
| | | deviceOS | | | | 1 | Consumption device Operating system and version |
| | | peripheralDevice | | | | 1 | Indication if the consumption device is a peripheral device. |
| | AVService | | | | | 0..N | |
| | | serviceID | | | | 1 | Globally-unique service identifier |
| | | serviceType | | | | 1 | Type of service |
| | | reportInterval | | | | 1..N | Reporting interval |
| | | | startTime | | | 1 | Start time of reporting interval |
| | | | endTime | | | 1 | End time of reporting interval |
| | | | DestinationDeviceType | | | 1 | Destination device type |
| | | | ContentID | | | 1 | |
| | | | | type | | 1 | Defined values: "EIDR" or "Ad-ID" |
| | | | | cid | | 1 | Patterned string |
| | | | Component | | | 1..N | Individual content components within a given channel |
| | | | | componentType | | 1 | Type of the component (e.g. audio, video, closed caption, etc.) |
| | | | | componentRole | | 1 | Role of the component |
| | | | | componentName | | 0..1 | Human readable name of the component |
| | | | | componentID | | 1 | Component ID |
| | | | | componentLang | | 0..1 | Component Language |
| | | | | startTime | | 1 | Start time of the interval when content component is presented |
| | | | | endTime | | 1 | End time of the interval when content component is presented |
| | | | | SourceDeliveryPath | | 1 | Delivery path used for or the source of the content component being consumed |
| | | | | | type | 1 | Type of delivery path used for or source of the content component being consumed |
| | | | | | startTime | 1 | Start time of the interval when content component is received via indicated delivery path or from the source |
| | | | | | @endTime | 1 | End time of the interval when content component is received via indicated delivery path or from the source |
| | | | AppInterval | | | 0..N | Interval of active Application |
| | | | | appId | | 1 | Application identifier |
| | | | | startTime | | 1 | Start time of interval |
| | | | | endTime | | 1 | End time of interval |
| | | | | LifeCycle | | 1 | Application Lifecycle |
| | | | | Tags | | 1 | Application tags |

FIG. 23

```
{
    "id": "http://atsc.org/version/3.0/serviceusagereporting/usagereport#",
    "$schema": "http://json-schema.org/draft-04/schema#",
    "title": "ATSC 3.0 Service Usage Report Consumption Data Message",
    "description": "Service Usage Report Consumption Data Message Schema as defined in
ATSC 3.0 (c) 2015 atsc.org - All rights reserved.",
    "type": "object",
    "properties": {
    "required": ["ConsumptionDataMessage"],
    "ConsumptionDataMessage": {
      "type": "object",
      "properties": {
        "protocolVersion": {
          "type": "string" , "pattern": "^0[xX][0-9a-fA-F]{2}$", "minLength": 4, "maxLength": 4
        },
        {
        "DeviceInfo": {
          "type": "array",
          "items": {
            "type": "object",
            "properties": {
              "deviceID": {"type": "string"},
              "deviceModel": {"type": "string"},
              "deviceManufacturer": {"type": "string"},
              "deviceOS": {"type": "string"},
              "peripheralDevice": {
                "type": "string",
                "enum": ["TRUE","FALSE","PRIVATE"]
              }
            },
            "required":
     ["deviceID","deviceModel","deviceManufacturer","deviceOS","peripheralDevice"]
          }
        },
        "minItems": 1,
        "maxItems": 1
    },
        "AVService": {
          "type": "object",
          "properties": {
            "serviceId": {
              "type": "string","format": "uri"
            },
            "serviceType": {
              "type": "integer"},
            "reportInterval": {
              "type": "object",
              "properties": {
                "startTime": {
                  "type": "string",
                  "format" : "date-time"
                },
                "endTime": {
                  "type": "string",
                  "format" : "date-time"
```

FIG.24A

```
        },
        "DestinationDeviceType": {
          "type": "integer",
          "minimum": 0,
          "maximum": 255
        },
        "ContentID": {
          "type": "object",
          "properties": {
          "oneOf": [ {"type": {"type": "string", "enum": ["EIDR"]},
          "cid": {"type": "string", "pattern": "^10\\.5240\\/([0-9a-fA-F]{4}-){5}[0-9A-Z]$",
             "minLength": 34, "maxLength": 34}},
             {"type": {"type": "string", "enum": ["AD-ID"]},
          "cid": {"type": "string", "pattern": "^[1-9a-zA-Z]{1}[0-9a-zA-Z]{10}(H|D)?$",
             "minLength": 11, "maxLength": 12}}
          ]
          }
        },
        "Component": {
            "type": "object",
            "properties": {
               "componentType": {
                  "type": "integer",
                  "minimum": 0,
                  "maximum": 255
               },
               "componentRole": {
                  "type": "integer",
                  "minimum": 0,
                  "maximum": 255
               },
               "componentName": {
                  "type": "string"
               },
               "componentID": {
                  "type": "string"
               },
               "componentLang": {
                  "type": "string"
               },
               "startTime": {
                  "type": "string",
                  "format" : "date-time"
               },
               "endTime": {
                  "type": "string",
                  "format" : "date-time"
               },
               "SourceDeliveryPath": {
                  "type": "object",
                  "properties": {
                     "type": {
                        "type": "integer",
                        "minimum": 0,
                        "maximum": 255
```

FIG.24B

```
                            },
                            "startTime": {
                                "type": "string",
                                "format" : "date-time"
                            },
                            "endTime": {
                                "type": "string",
                                "format" : "date-time"
                            }
                        },
                        "required": ["type","startTime","endTime"]
                    }
                },
                "required":
["componentType","componentRole","componentID","startTime","endTime","SourceDeliveryPath"]
]

"AppInterval": {
                    "type": "object",
                    "properties": {
                        "appId": {
                            "type": "string"
                        },
                        "startTime": {
                            "type": "string",
                            "format" : "date-time"
                        },
                        "endTime": {
                            "type": "string",
                            "format" : "date-time"
                        }
                    },
                    "required": ["appId","startTime","endTime"]
                }
            },
            "required":
["startTime","endTime","DestinationDeviceType","timeShift","deviceType","Component"]
            },
            "required": ["channelNum","serviceType","reportInterval"]
        }}, },
    "required": ["protocolVersion","AVService"],
    "additionalProperties": false }
  },
  "maxProperties": 1
 }
}
```

FIG. 24 C

| Field | | | | | Cardinality | Description |
|---|---|---|---|---|---|---|
| CDM | | | | | 1 | Consumption Data Message |
| | protocolVersion | | | | 1 | Major and minor version of CDM protocol |
| | AVService | | | | 0..N | |
| | | serviceID | | | 1 | Globally-unique service identifier |
| | | serviceType | | | 1 | Type of service |
| | | DeviceInfo | | | 1 | Consumption Device information |
| | | | deviceID | | 1 | Consumption device identifier |
| | | | deviceModel | | 1 | Consumption device model |
| | | | deviceManufacturer | | 1 | Consumption device manufacturer |
| | | | deviceOS | | 1 | Consumption device Operating system and version |
| | | | peripheralDevice | | 1 | Indication if the consumption device is a peripheral device. |
| | | reportInterval | | | 1..N | Reporting interval |
| | | | startTime | | 1 | Start time of reporting interval |
| | | | endTime | | 1 | End time of reporting interval |
| | | DestinationDeviceType | | | 1 | Destination device type |
| | | ContentID | | | 1 | |
| | | | type | | 1 | Defined values: "EIDR" or "Ad-ID" |
| | | | cid | | 1 | Patterned string |
| | | Component | | | 1..N | Individual content components within a given channel |
| | | | componentType | | 1 | Type of the component (e.g. audio, video, closed caption, etc.) |
| | | | componentRole | | 1 | Role of the component |
| | | | componentName | | 0..1 | Human readable name of the component |
| | | | componentID | | 1 | Component ID |
| | | | componentLang | | 0..1 | Component Language |
| | | | startTime | | 1 | Start time of the interval when content component is presented |
| | | | endTime | | 1 | End time of the interval when content component is presented |
| | | | SourceDeliveryPath | | 1 | Delivery path used for or the source of the content component being consumed |
| | | | | type | 1 | Type of delivery path used for or source of the content component being consumed |
| | | | | startTime | 1 | Start time of the interval when content component is received via indicated delivery path or from the source |
| | | | | @endTime | 1 | End time of the interval when content component is received via indicated delivery path or from the source |
| | | AppInterval | | | 0..N | Interval of active Application |
| | | | appId | | 1 | Application identifier |
| | | | startTime | | 1 | Start time of interval |
| | | | endTime | | 1 | End time of interval |
| | | | Lifecycle | | 1 | Application Lifecycle |
| | | | Tags | | 1 | Application tags |

FIG. 25

| Field | | | | | | Cardinality | Description |
|---|---|---|---|---|---|---|---|
| CDM | | | | | | 1 | Consumption Data Message |
| | protocolVersion | | | | | 1 | Major and minor version of CDM protocol |
| | AVService | | | | | 0..N | |
| | | serviceID | | | | 1 | Globally-unique service identifier |
| | | serviceType | | | | 1 | Type of service |
| | | reportInterval | | | | 1..N | Reporting interval |
| | | | startTime | | | 1 | Start time of reporting interval |
| | | | endTime | | | 1 | End time of reporting interval |
| | | | DestinationDeviceType | | | 1 | Destination device type |
| | | | DeviceInfo | | | 1 | Consumption Device information |
| | | | | deviceID | | 1 | Consumption device identifier |
| | | | | deviceModel | | 1 | Consumption device model |
| | | | | deviceManufacturer | | 1 | Consumption device manufacturer |
| | | | | deviceOS | | 1 | Consumption device Operating system and version |
| | | | | peripheralDevice | | 1 | Indication if the consumption device is a peripheral device. |
| | | ContentID | | | | 1 | |
| | | | type | | | 1 | Defined values: "EIDR" or "Ad-ID" |
| | | | cid | | | 1 | Patterned string |
| | | Component | | | | 1..N | Individual content components within a given channel |
| | | | componentType | | | 1 | Type of the component (e.g. audio, video, closed caption, etc.) |
| | | | componentRole | | | 1 | Role of the component |
| | | | componentName | | | 0..1 | Human readable name of the component |
| | | | componentID | | | 1 | Component ID |
| | | | componentLang | | | 0..1 | Component Language |
| | | | startTime | | | 1 | Start time of the interval when content component is presented |
| | | | endTime | | | 1 | End time of the interval when content component is presented |
| | | | SourceDeliveryPath | | | 1 | Delivery path used for or the source of the content component being consumed |
| | | | | type | | 1 | Type of delivery path used for or source of the content component being consumed |
| | | | | startTime | | 1 | Start time of the interval when content component is received via indicated delivery path or from the source |
| | | | | @endTime | | 1 | End time of the interval when content component is received via indicated delivery path or from the source |
| | | AppInterval | | | | 0..N | Interval of active Application |
| | | | appId | | | 1 | Application identifier |
| | | | startTime | | | 1 | Start time of interval |
| | | | endTime | | | 1 | End time of interval |
| | | | LifeCycle | | | 1 | Application Lifecycle |
| | | | Tags | | | 1 | Application tags |

FIG. 26

METHOD FOR PROVIDING A CONSUMPTION DATA MESSAGE

CROSS REFERENCE TO RELATED APPLICATIONS

This Non-provisional application claims priority under 35 U.S.C. § 119 on U.S. Provisional Patent Application No. 62/253,011, filed on Nov. 9, 2015, the entire contents of which are hereby incorporated by reference.

TECHNICAL FIELD

The present disclosure relates generally to a system for service usage reporting.

BACKGROUND ART

A video service is capable of sending audio, visual, closed caption, application, and other data content to a receiving device. The receiving device typically presents one or more of the audio, visual, closed caption, application, and other data content to the viewer, such as on a television device. In some cases, the viewer would like to use their mobile device, such as a mobile phone, to interact with the video content. However, how to most effectively interact with the audiovisual content on the receiving device using the mobile phone tends to be problematic due to synchronization issues. In one case the viewer may want to receive audiovisual content on a receiver such as a television device. At the same time the user may want to receive adjunct associated content on a second screen, e.g. a mobile device such as a smartphone or a tablet. The content received on the second screen device may be same as alternate content associated with the audiovisual content being received on the television. The user may typically like these two contents be presented on the primary and second screen device in a synchronized manner. In other case the content received on the second screen device may be alternative components (e.g. alternative camera angle) not currently presented on the primary device. The user may typically like these two contents be presented on the primary and second screen device in a synchronized manner. In some cases the term companion device may be used for the second screen device.

SUMMARY OF INVENTION

One aspect of the invention provides a method for providing a consumption device message from a consumption device that includes a processor to a service usage data server comprising: (a) providing by said processor of said consumption device said consumption device message from said consumption device to said service usage data server that includes: (i) a deviceInfo element that describes information of said consumption device; (ii) a deviceID field of said deviceInfo element that describes an identifier of said consumption device; (iii) a deviceModel field of said deviceInfo element that describes a model of said consumption device; (iv) a deviceManufacturer field of said deviceInfo element that describes a manufacturer of said consumption device; (v) a deviceOS field of said deviceInfo element that describes both an operating system and version of said operating system of said consumption device; (vi) a peripheralDevice field of said deviceInfo element that describes whether said consumption device is an external peripheral; (b) wherein said deviceID field has a selected value to indicate said identifier of said consumption device is intentionally not revealed; (c) wherein said deviceModel field has said selected value to indicate said model of said consumption device is intentionally not revealed; (d) wherein said deviceManufacturer field has said selected value to indicate said manufacturer of said consumption device is intentionally not revealed; (e) wherein said deviceOS field has said selected value to indicate said operating system of said consumption device is intentionally not revealed; (f) wherein said peripheralDevice field has said selected value to indicate said whether said consumption device is said external peripheral is intentionally not revealed.

One aspect of the invention provides a consumption device that includes a processor providing a consumption device message to a service usage data server comprising: (a) said consumption device together with said processor providing said consumption device message from said consumption device to said service usage data server that includes: (i) a deviceInfo element that describes information of said consumption device; (ii) a deviceID field of said deviceInfo element that describes an identifier of said consumption device; (iii) a deviceModel field of said deviceInfo element that describes a model of said consumption device; (iv) a deviceManufacturer field of said deviceInfo element that describes a manufacturer of said consumption device; (v) a deviceOS field of said deviceInfo element that describes both an operating system and version of said operating system of said consumption device; (vi) a peripheralDevice field of said deviceInfo element that describes whether said consumption device is an external peripheral; (b) wherein said deviceID field has a selected value to indicate said identifier of said consumption device is intentionally not revealed; (c) wherein said deviceModel field has said selected value to indicate said model of said consumption device is intentionally not revealed; (d) wherein said deviceManufacturer field has said selected value to indicate said manufacturer of said consumption device is intentionally not revealed; (e) wherein said deviceOS field has said selected value to indicate said operating system of said consumption device is intentionally not revealed; (f) wherein said peripheralDevice field has said selected value to indicate said whether said consumption device is said external peripheral is intentionally not revealed.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 1 illustrates a video system.
FIG. 2 illustrates a data server and a receiver.
FIG. 3 illustrates a consumption data unit.
FIG. 4 illustrates a consumption data message.
FIG. 5 illustrates a logical structure of a consumption data message.
FIG. 6 illustrates a logical structure of a component element of a consumption data message.
FIG. 8 illustrates a deviceType attribute.
FIG. 9 illustrates an alternative deviceType attribute.
FIG. 10 illustrates another alternative deviceType element.
FIG. 11 illustrates a deliveryPath attribute.

FIG. 12 illustrates an alternative deliveryPath attribute.

FIG. 13 illustrates another alternative deliveryPath element.

FIG. 14 illustrates a component element.

FIG. 15 illustrates a consumption data message logical structure.

FIG. 16A illustrates a Java Script Object Notation (JSON) schema.

FIG. 16B illustrates a Java Script Object Notation (JSON) schema.

FIG. 16C illustrates a Java Script Object Notation (JSON) schema.

FIG. 16D illustrates a Java Script Object Notation (JSON) schema.

FIG. 17 illustrates a portion of XML schema.

FIG. 18A illustrates a XML schema.

FIG. 18B illustrates a XML schema.

FIG. 18C illustrates a XML schema.

FIG. 19 illustrates a logical structure of device information.

FIG. 20 illustrates a JSON schema.

FIG. 21 illustrates a XML schema.

FIG. 23 illustrates logical structure of consumption data message.

FIG. 24A illustrates a JSON schema.

FIG. 24B illustrates a JSON schema.

FIG. 24C illustrates a JSON schema.

FIG. 25 illustrates logical structure of consumption data message.

FIG. 26 illustrates logical structure of consumption data message.

DESCRIPTION OF EMBODIMENTS

Figure 7:
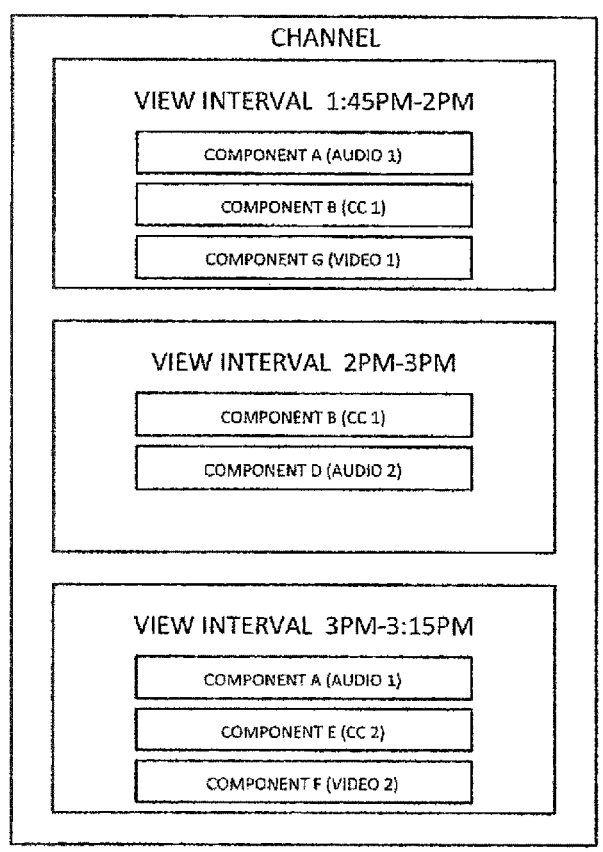
FIG. 7 illustrates a component and viewing types.

Referring to FIG. 1, a logical architecture of an audiovisual system is illustrated. The system includes a broadcasting system 100 that provides a source of audiovisual (video and/or audio and/or closed caption and/or other data and/or applications) content. The audiovisual content may be provided in any suitable manner and using suitable standards, such as for example, MPEG-2, MPEG-4 or ATSC. By way of example, the broadcasting system may be provided from a broadcasting antenna, a cable, a network based audiovisual source, a compact disk, a hard drive, a digital video disc, and/or an Internet based audiovisual source. The broadcasting system 100 may provide the content through any suitable broadcast network 110. Additionally or alternatively the system includes a broadband server system 105 that provides a source of audiovisual (video and/or audio and/or closed caption and/or other data and/or applications) content. This audiovisual content may be also be provided in any suitable manner and using suitable standards, such as for example, MPEG-2, MPEG-4 or ATSC. By way of example, the broadband server system may be provided from an Internet or over the top or network based audiovisual source audiovisual source. The broadband server system 105 may provide the content through any suitable broadband network 115. A receiver 120 receives the audiovisual content together with any other data provided with the audiovisual content, such as digital data, data services, or otherwise. The receiver may receive some of the content components from broadcasting system via broadcast network. For example video component may be received in this manner from broadcasting system via broadcast network. The receiver may receive some of the content components from broadband server system via broadband network. For example audio component may be received in this manner from broadband server system via broadband network. The receiver 120, generally referred to as a primary device, is preferably configured to receive the type of content being provided there to. The receiver may be, for example, a television, a laptop, a tablet, a phone, or any other device suitable to present the audiovisual content to a viewer. The receiver may be typically in a user's home. The receiver 120 may be a Usage Reporting-Capable Receiver. The receiver may likewise communicate with another display device 130, generally referred to as a companion device, through a home network 140. In another embodiment the companion device may communicate directly with an outside server (e.g., broadcasting system 100 or broadband server system 105) to receive audiovisual and/or adjunct content. The home network is preferably a wireless or wired type network, such as for example, WiFi, Ethernet, 3GPP, Bluetooth, infra-red, HTTP. In some cases the home network may be a local area network. In some cases the primary and companion devices may be inside a user's home. In other cases, the home network may be an office environment. The companion device may include, for example, a mobile phone, a mobile tablet, a laptop, a computer, or other display device. In addition, the receiver may simultaneously communicate with a plurality of companion devices 130. Additionally one companion device may communicate simultaneously with multiple primary devices 120. In some embodiments the primary device may be called a first screen device. In some embodiments the companion device may be called a second screen device. The terms primary device and first screen device and receiver may be used interchangeably. The terms second companion device and second screen device may be used interchangeably.

The primary device 120 may be capable of providing information to the companion device 130. In addition, the companion device 130 may provide information to the primary device 120. The broadcasting system 100 may be capable of providing information to the receiver 120. In addition, the receiver 120 may provide information to the broadcasting system 100. The broadcasting system 100 may be capable of providing information to the companion device 130. In addition, the companion device 130 may provide information to the broadcasting system 100. The broadband server system 105 may be capable of providing information to the receiver 120. In addition, the receiver 120 may provide information to the broadband server system 105. The broadband server system 105 may be capable of providing information to the companion device 130. In addition, the companion device 130 may provide information to the broadband server system 105. The information may include, for example, audio and/or visual and/or data content and/or closed caption and/or applications.

In many environments it is desirable for the receiver 120 and/or companion device 130 to monitor the usage of audio-visual content consumed by the user and provide information related to the consumption of the audio-visual content to the broadcasting system 100 and/or the broadband server system 105. In many environments it is desirable for the receiver 120 and/or companion device 130 to monitor the usage of data content by the user and provide information related to the consumption of the data content to the broadcasting system 100 and/or the broadband server system 105. By way of example, the broadcasting system 100 may include a broadcasting server and/or a data server. By way of example, the receiver 120 and/or companion device 130 may be a usage reporting capable receiver. In another example the broadband server system 105 may include a broadband server and/or a data server.

Referring to FIG. 2, the system may be generalized as a service usage data server 200 that provides audio-visual content together with auxiliary data, if desired, and a usage reporting capable receiver 210 that provides data to the data server 200. In general, the receiver 210 manages functions related to service consumption data collection, storage, and/or transmission to the data server 200. In general, the data server 200 in addition to the capability of providing audio-visual-data services, include data gathering agents and usage report generation. The data server 200 may include one or more individual servers, as desired.

Referring to FIG. 3, the fundamental record that captures consumption information by the receiver 210 may be referred to as a consumption data unit 300, referred to herein as "CDU". For a streaming audiovisual channel, each CDU 300 identifies an interval during which the channel was viewed 310. Such a CDU may include, for example, a channel identifier 320, a time the viewing started 330, and a time the viewing ended 340. If any triggered declarative objects 350, referred to herein as "TDO", are active during the viewing interval, it may also record the intervals during which the TDOs are active (whether on a primary device or a "second screen" device) 360, including a TDO identifier 370, a time the TDO started being active 380, and a time it stopped being active 390. In some cases a triggered declarative object may be an application. In another case a triggered declarative object may be a webpage or a resource accessed via a uniform resource locator (URL).

For a stand-alone non-real time service, referred to herein as "NRT", each CDU may capture an interval during which the service was selected. Such a CDU may include a service identifier, a time the interval started, a time the interval ended, and identifiers of the NRT content items presented during the interval.

For streaming services and stand-alone NRT services, events logged into a CDU may correspond to usage intervals of no less than X seconds (or other suitable time). For TDO activity, events logged into a CDU may correspond to usage intervals of no less than Y seconds. Thus, if an A/V channel or NRT service remains selected for less than X seconds, as an example, that event is not reported, and if a TDO is active for less than Y seconds, as an example, that event is not reported. The precision and accuracy of start times and end times in the CDUs should be within Z second(s). In an example case the value of X may be 10 seconds, value of Y may be 5 seconds and value of Z may be 1 second.

Referring to FIG. 4, the fundamental data structure used to transmit CDUs from the receiver 210 to the data server 200 may be referred to as a consumption data message 400, referred to herein as "CDM". A CDM may contain data for a single service, or it may contain data for multiple services in the case that data for multiple services is being reported to the same data server.

The CDM may be hierarchically divided into three parts to reduce the amount of data that is transmitted:

The first part contains a "Report Header" fields 410 that are common to all virtual channels and services and all consumption data. This part is preferably sent only once in the transmission session.

The second part contains "Service Identifier" fields 420 that are common to all consumption data associated with a single virtual channel or NRT service. This part is preferably sent once for each channel or service included in the report.

The third part contains the individual consumption data records 430. This part is preferably sent once for each time interval when an audio-visual channel is being viewed or an NRT service is selected.

A CDM may be an XML document containing a "CDM" root element that conforms to the definition in the XML schema that has namespace http://www.atsc.org/XMLSchemas/iss-cdm-1 (as an example).

Referring to FIG. 5, an exemplary logical structure is illustrated for a consumption data message 500. This consists of elements and attributes with their cardinality, data type used for representing the elements and attributes and their description.

A protocol Version field 510 contains the major and minor protocol versions of the syntax and semantics of the CDM 500, coded as hexadecimal values each in the range 0x0 to 0xF. The major protocol value may be in the four most significant bits of the field. A change in the major version level indicates a non-backward-compatible level of change. The initial value of this field may be 0. The value of this field may be incremented by one each time the structure of the CDM is changed in a non-backward compatible manner from a previous major version. The second number is the file minor version, which may represent the minor version of the syntax and semantics of the CDM. A change in the minor version level for each value of the first number may indicate a backward-compatible level of change within that major version. The initial value is 0. The value of this field may be incremented by one each time the structure of the CMD is changed in backward-compatible manner from a previous minor change (within the scope of a major revision).

An AVChannel element 520 contains the list of zero or more elements describing activity intervals based on content delivered continuously.

A channelNum 522 is a 16-bit hexBinary field that may contain major and minor channel numbers. If these numbers are not determinable, the value may be set to 0xFFFF.

A serviceType 524 is a value of the field service_type that is (or was—for time shifted content) present in a virtual channel table for the instance being reported.

A ViewInterval 530 is one or more periods of display of content for the corresponding channelNum 522.

A startTime 532 is a dateTime computed from a coordinated universal time ("UTC") seconds count at the beginning of the event. An interval may begin when display of the content begins.

An endTime 534 is a dateTime computed from the UTC seconds count at the end of the event. An interval may end when display of the content ends.

An usageType 536 is an unsigned integer denoting the class of usage. The usageType 536 may be defined as follows:

1—Full: content on main screen (no picture in picture).
2—PIP active: content on main screen with picture in picture activated, no change in main frame size.
3—PIP use: content on the 'small' picture in picture.
4—Other/Obscured: user caused content under the control of this standard's provisions to be rendered in less than the full frame of the device (such as activating a web session). This includes the potential of user controlling the frame size (such as squeeze with side or top bars).
5 to 99—Reserved.

This does not reflect any DO presence or absence, as presence and duration of each DO is reported explicitly within each ViewInterval 530.

A timeShift 538 is an unsigned integer 0 or 1, with 1 indicating that the content has been time shifted.

A viewStartTime 540 is a dateTime computed from the UTC seconds count at the beginning of the event. An interval may end when display of the content begins.

A viewEndTime 542 is a dateTime computed from the UTC seconds count at the end of the event. An interval may end when display of the content ends.

A DOInterval 550 is the interval for each active declarative object.

A doId 552 is a string representing an identifier for the declarative object for this reporting record. This may contain the c=term of contentID.

A startTime 554 is a dateTime computed from the UTC seconds count at the beginning of the event. An interval may begin when display of the content begins. The value may not be less than the value of startTime 532 of this ViewInterval 530 instance.

An endTime 556 is a dateTime computed from the UTC seconds count at the end of the event. An intervals may end when display of the content ends. The value may not be greater than the value of endTime 534 of this ViewInterval 530 instance.

A NRTService 560 element contains the list of zero or more elements describing rendering of previously obtained files.

A serviceID 570 is a 16-bit hexBinary field that may contain a service_id or files, or 0xFFFF for rendering periods for any other files from any other source.

A NRTInterval 580 is one or more periods of display of a NRT service 560.

A startTime 582 is a dateTime computed from the UTC seconds count at the beginning of the event. An interval may begin when display of the content begins.

An endTime 584 is a dateTime computed from the UTC seconds count at the end of the event. An interval may end when display of the content ends.

A NRTItem 586 is an interval for each item in the NRT service being rendered.

A contentItemId 590 is a string which may contain the contents of the content_name_text( ) representing the identifier for the item.

A startTime 592 is a dateTime computed from the UTC seconds count at the beginning of the event. An interval may begin when display of the content begins. The value may not be less than the value of startTime 582 of this ViewInterval 530 instance.

An endTime 590 is a dateTime computed from the UTC seconds count at the end of the event. An interval may end when display of the content ends. The value may not be greater than the value of endTime 584 of this ViewInterval 530 instance.

The transmission of the CDMs may be performed in any suitable manner. By way of example, when a broadcaster wants to receive reports, the URL to be used for transmitting CDMs may be provided by the broadcaster via suitable commands. The broadcaster may decide the granularity of the destination addresses, that is, one destination address URL per service, one per a set of services, one for an RF multiplex, one for a region, and/or one for a nation. This is not necessarily explicitly signaled; rather the same URL may be repeated for each service when the scope is broader than a single service.

When the receiver 210 is prepared to transmit a CDM to a data server 200, it may issue an HTTP PUT request to the server, with the CDM in the body of the request. In another embodiment when the receiver 210 is prepared to transmit a CDM to a data server 200, it may issue an HTTP POST request to the server, with the CDM in the body of the request. In another embodiment When the receiver 210 is prepared to transmit a CDM to a data server 200, it may issue an HTTP PATCH request to the server, with the CDM in the body of the request. In another embodiment, when the receiver 210 is prepared to transmit a CDM to a data server 200, it may use WebSOCKET protocol to communicate to the server, with the CDM in the body of the request. The receiver may maintain a "date of last" time record which is accessible by TDOs for that service. A Usage Reporting-Capable Receiver (URCR) performs an optional receiver function which allows it to interoperate with service usage data server systems operated by (or on behalf of) service providers. A receiver that supports the URCR function may implement the requirements defined herein. If a week elapses after the last report, the URCR may transmit the CDM for that interval with the CDUs for each covered service, or when the allocated CDU storage reaches a level of 80% full, whichever occurs first.

If a CDM is not successfully transmitted due to a failure mode, it should remain stored, and it should be retransmitted as soon as the failure mode is rectified. The following are some exemplary failure modes:

(1) CDM destination address unavailable;
(2) Incorrect CDM destination address;
(3) HTTP session failure.

The receiver 210 should default to the opt-in state for usage data reporting. The receiver may disclose to the consumer that generic usage data will be reported unless they opt out on a service provider by service provider basis. The URCR may report usage data for a given service provider unless the user has opted out of the usage reporting functions for that service provider.

The receiver should permit the user to see what services they have opted into, and to change the state of any opt-in/opt-out status. The receiver may retain opt-in/opt-out choices through loss of power to the unit. For encrypted services, the user interface offering the opt-in/opt-out choice is preferably presented during the service authorization process. For unencrypted services, an authorization session may be used with TDO-controlled questions and answers. The receiver preferably does not directly report any such answers, with such being reported by the TDO.

It was determined that the system should enable service usage measurement and reporting for individual content components within a given service. In this manner, more particularized information may be provided to the data server, which identifies particular characteristics of the available audio, visual, closed caption, data, and application content that are selected or otherwise used by the viewer. In particular, this permits an indication of the component for which the usage report is reported. By way of example, the receiver may identify a particular audio component from a plurality of audio components (e.g., different languages or different tracks) to be reported to the data server. By way of example, the receiver may identify a particular video component from a plurality of video components (e.g., different video views) to be reported to the data server.

Referring to FIG. 6, a component element 600 may be included in the CDM 500 which provides the usage reporting for individual content components.

A Component 600 has a content component type, role, name, ID, and time interval information.

A componentType 610 indicates the type of component 600. The values for componentType 610 may be, for example, as follows:

Value of 0 indicates an audio component;
Value of 1 indicates a video component;

Value of 2 indicated a closed caption component;
Value of 3 indicates an application component;
Value of 4 indicates a metadata component;
Values 5 to 255 are reserved.

A componentRole 620 may be a string representing the role or kind of the component's role/kind. The role/kind is described further below.

A componentName 630 may be a string representing the human readable name of the component.

A componentId 640 may be a string representing component identifier. In some embodiments this might be a URL which identifies a component.

A startTime 650 may be a dateTime computed from the UTC seconds count at the beginning of the event. An interval may begin when display of this content component begins. The value may not be less than the value of startTime 532 of this ViewInterval 530 instance. This ViewInterval 530 instance may be the parent of this Component element.

An endTime 660 may be a dateTime computed from the UTC seconds count at the end of the event. An intervals may end when display of this content component ends. The value may not be greater than the value of endTime 534 of this ViewInterval 530 instance. This ViewInterval 530 instance may be the parent of this Component element.

By the inclusion of the startTime 650 and the endTime 660, the system may identify the time intervals during which a particular component is being used. As such different components may be used during different time interval inside a viewInterval's time interval.

Referring to FIG. 7, by way of example, a channel/service usage report may include a plurality of view intervals. The term reporting interval may be used instead of the term view interval. For example, there may be a view interval from 1:45 pm to 2 pm, a view interval from 2 pm to 3 pm, and a view interval from 3 pm-3:15 pm. For the view interval from 1:45 pm to 2 pm there may be a plurality of components included in the usage report therewith, such as component A (i.e., Spanish Audio), such as component B (i.e., English Closed Captioning), such as component G (i.e., main video view). For the view interval from 2 pm to 3 pm there may be a plurality of components included therewith, such as component B (i.e., English Closed Captioning), such as component D (i.e., French Audio). For the view interval from 3 pm to 3:15 pm there may be a plurality of components included therewith, such as component A (i.e., Spanish Audio), component E (i.e., Spanish Closed Captioning), component F (i.e., alternative video view). In this manner, or other structures, the time during which particular components are active may be identified.

Figure 7A:
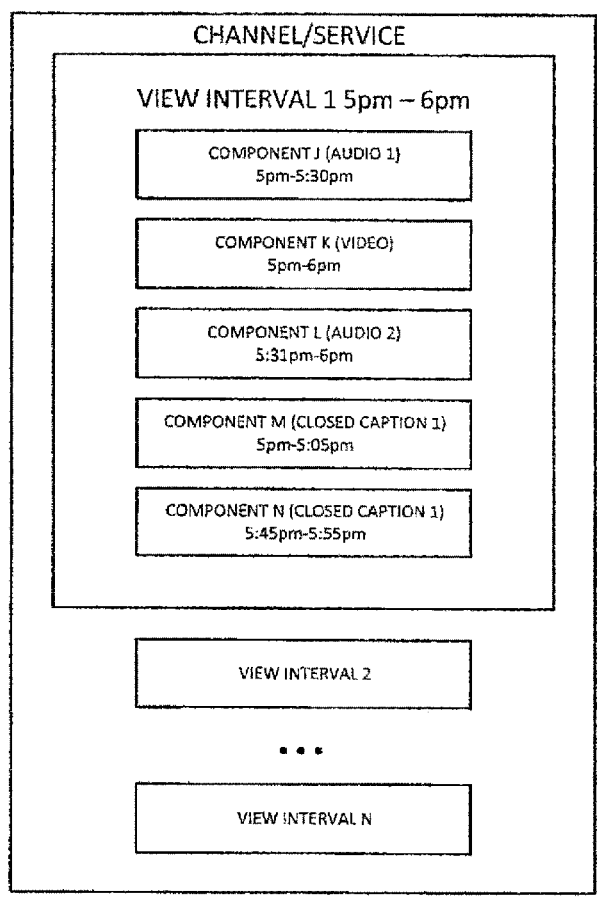
FIG. 7A illustrates view intervals and components.

Another example usage is now described. Referring to FIG. 7A, by way of example, a channel/service usage report may include a plurality of view intervals (View Interval 1, View Interval 2, . . . View Interval N). For example, there may be a View Interval 1 from 5 PM to 6 PM. Details about other view intervals (e.g. View Interval 2, . . . View Interval N) are not shown in FIG. 7A. For the View Interval 1 from 5 PM to 6 PM there may be a plurality of components included in the usage report therewith. Also different components may be active/used during different time intervals within the view interval of 5 PM to 6 PM. For example a component J-Audio1 (i.e., English Audio) may be used from 5 PM to 5:30 PM. The receiver may decide (e.g. at the request of the viewer) to use component L-Audio2 (i.e. Spanish Audio) from 5:31 PM to 6:00 PM. Also the component K—Video component may be used from 5:00 PM to 6:00 PM, i.e. during the entire duration of view interval (View Interval 1 which spans 5 PM to 6 PM). Additionally a closed caption component may be only intermittently used during the view interval (View Interval 1 which spans 5 PM to 6 PM). For example component M—closed caption1 (i.e., English Closed Captioning) may be used only for the first 5 minutes i.e. from 5:00 PM to 5:05 PM. Also component N—closed caption1 (i.e., English Closed Captioning) may be used only later during the view interval for the 10 minutes i.e. from 5:45 PM to 5:55 PM.

Figure 7B:
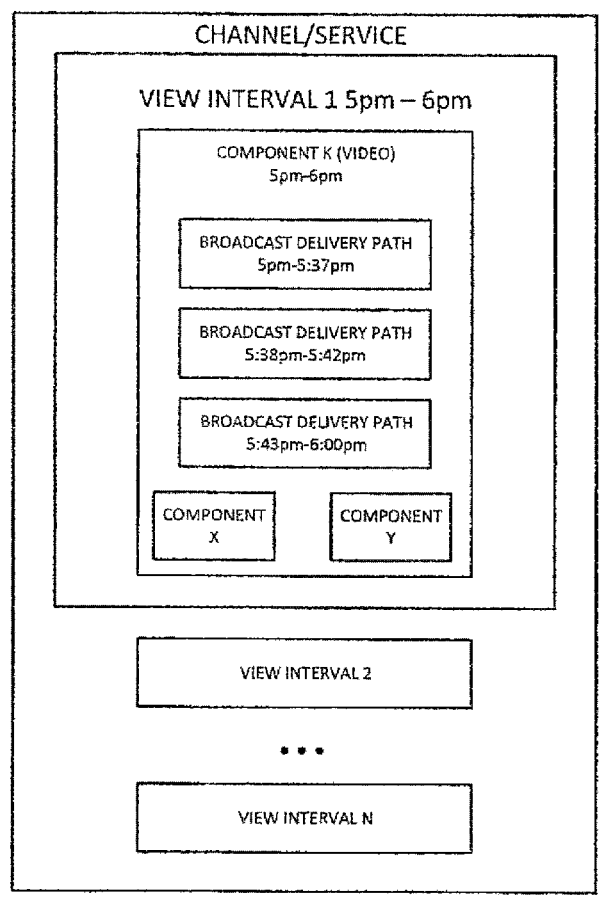
FIG. 7B illustrates view intervals, components, and delivery paths.

FIG. 7B further describes different delivery paths may be used for a component during a view interval for a channel/service. Referring to FIG. 7B, by way of example, a channel/service usage report may include a plurality of view intervals (View Interval 1, View Interval 2, . . . View Interval N). For example, there may be a View Interval 1 from 5 PM to 6 PM. Details about other view intervals (e.g. View Interval 2, . . . View Interval N) are not shown in FIG. 7B. For the View Interval 1 from 5 PM to 6 PM there may be a plurality of components included in the usage report therewith. Also different components (e.g. Component X, . . . Component Y) may be active/used during different time intervals within the view interval of 5 PM to 6 PM. Details about other components (e.g. Component X, . . . Component Y) are not shown in FIG. 7B. For example a component K—Video component may be used from 5:00 PM to 6:00 PM, i.e. during the entire duration of view interval (View Interval 1 which spans 5 PM to 6 PM). During this time interval, the component K may be delivered to the receiver via different paths as shown in FIG. 7B. For example from 5:00 PM to 5:37 PM the component K may be delivered via terrestrial broadcast delivery path to the receiver. For example from 5:38 PM to 5:42 PM the component K may be delivered via broadband delivery path to the receiver. This may be due toe the unavailability of broadcast path during 5:38 PM to 5:42 PM or due to some other reason such as weaker broadcast signal. For example from 5:43 PM to 6:00 PM the component K may be again delivered via terrestrial broadcast delivery path to the receiver. Further details related to this different delivery paths are described later in relation to FIG. 11, FIG. 12, FIG. 13, and FIG. 14.

With reference to FIG. 7, FIG. 7A, FIG. 7B it should be noted that although the above examples indicate time and time interval as for example "5:00 PM" or "1:45 pm", the time and time interval may be indicated by other well-known techniques. For example the time interval may be indicated from UTC seconds count at the beginning or end of an event or from beginning or end of some other reference point. Some other similar techniques may be used for time and time interval indication in the above examples and in the semantics of various elements below.

In one embodiment XML schema corresponding to Component element may be as follows:

```
<xs:element name="Component" minOccurs="0"
maxOccurs="unbounded">
    <xs:complexType>
<xs:attribute name="componentType" type="xs:unsignedByte"
use="required"/>
<xs:attribute name="componentRole" type="xs:string" use="required"/>
<xs:attribute name="componentName" type="xs:string" use="optional"/>
<xs:attribute name="componentID" type="xs:string" use="required"/>
<xs:attribute name="startTime" type="xs:dateTime" use="required"/>
<xs:attribute name="endTime" type="xs:dateTime" use="required"/>
    </xs:complexType>
</xs:element>
```

In one embodiment JSON schema corresponding to Component element may be as shown below:

```
{
    "id": "http://atsc.org/version/3.0/ur/ur_component#",
    "$schema": "http://json-schema.org/draft-04/schema#",
    "title": "ATSC component for consumption data message",,
    "description": "Component indication in consumption data message",
    "type": "object",
    "properties": {
    "required": ["Component"],
    "Component": {
        "type": "object",
        "properties": {
            "componentType": {
                "type": "integer"
            },
            "componentRole": {
                "type": "string"
            },
            "componentName": {
                "type": "string"
            },
            "componentID": {
                "type": "string"
            },
    "startTime": {
                "type": "date-time"
            },
    "endTime": {
                "type": "date-time"
    }
            }
        },
        "required":
["componentType","componentRole","componentID","startTime","endTime"]
            "additionalProperties": false },
            "maxProperties": 1
        }
    }
}
```

In one embodiment the componentName 630 may be an element instead of attribute and its cardinality may be 0 . . . N and the componentName 630 may have a language attribute which can indicate the name of the component in different languages. For example this attribute when using XML representation may be "xml:lang" attribute.

In one embodiment the Component 600 element may be a sub-element of the ViewInterval 530 element.

In another embodiment the Component 600 element may be sub-element of one or more other elements.

In one embodiment the role/kind of the audio component may be one or more of the following.

For an audio component the role may be textual description intended for human consumption regarding role of the component.

Strings which could be used to describe the role of component of the service may include:
"Complete main"
"Music"/"Music-and-effects"
"Dialog"/"Dialogue"
"Effects"
"Visually impaired"
"Hearing impaired"
"Commentary"
"Description"/"Textual description"
"Sign"/"Sign language"
"Metadata"
"Emergency"
"Voice-over"
"Karaoke"
Any other useful description for a viewer can be provided, as desired.

In one embodiment the role/kind of the video component may be one or more of the following.

For a video component the role may be a textual description intended for human consumption regarding role of the component.

Strings which could be used to describe the role of video component of the service may include:
"Primary video"
"Alternative camera view"
"Other alternative video component"
"Sign language inset"
"Follow subject video"
"3D video left/right view"
"3D video depth information"
"Part of video array <x,y> of <n,m>"
"Follow-Subject metadata"
Any other useful description for a viewer can be provided.

In one embodiment the role/kind of the closed caption component may be one or more of the following.

For a closed caption component the role may be a textual description intended for human consumption regarding role of the component.

Strings which could be used to describe the role of video component of the service may include:
"Normal"
"Easy reader"
Any other useful description for a viewer can be provided.

In one embodiment the role/kind of the application component may be one or more of the following.

For an application component the role may be a textual description intended for human consumption regarding role of the component.

Strings which could be used to describe the role of video component of the service may include:
"On Demand"
"Start-over"

"Companion-Screen"

Any other useful description for a viewer can be provided.

In some embodiment the data type "unsignedByte" may instead be represented by the data type "hexBinary"

In some embodiments instead of values 5 to 255 being reserved values 5 to 99 (or some other number) may be reserved.

In some embodiments instead of values 5 to 255 being reserved values 4 to 255 (or some other number) may be reserved.

In some embodiments instead of values 5 to 255 being reserved values 4 to 99 (or some other number) may be reserved.

In other embodiments the cardinality of some of the elements may be changed. For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

In other embodiments some of the elements could instead be signalled as attributes.

In other embodiments some of the attributes could instead be signalled as elements.

In other embodiment some of the required elements may be changed to optional elements or vice-a-versa.

In some embodiments instead of XML some other format e.g. JSON/CSV/BNF/ABNF/EBNF may be used for representing the same information conveyed in the XML format.

In alternative embodiment additional namespace qualifier may be added for an xml element/attributes/type.

In another embodiment a different name may be used for an element or attribute. For example instead of "componentRole" the element may be called "caR" or "caRole" or something else.

It was determined that the system should enable service usage measurement and reporting for the device (e.g., viewing device) the content is being consumed on within a given service. In this manner, more particularized information may be provided to the data server, which identifies a particular device (or characteristics thereof or logical role thereof) of audio-visual content (including data, applications) that are selected or otherwise used by the viewer. In particular, this permits an indication of the device for which the usage report is reported. In addition, it is also desirable to indicate whether the content is being consumed using a primary device and/or a companion device.

It is desirable to indicate a "presentation device type" which indicates if the content is consumed on a primary device (PD) or a companion device (CD). It should be noted that primary device or a companion device are logical roles.

Referring to FIG. 8, one technique to indicate if the content is consumed on a primary device or a companion device is using a Boolean data type for the device type indication.

For example, a deviceType value of 0 indicates content is presented on primary device. For example, a deviceType value of 1 indicates the content is presented on companion device.

In one embodiment the deviceType maybe a sub-element or attribute of an element of CDM illustrated in FIG. 5. In one embodiment the deviceType may be an attribute of ViewInterval element illustrated in FIG. 5.

In one embodiment XML schema corresponding to deviceType element may be as follows:
<xs:element name="deviceType" type="xs:boolean" minOccurs="1"/>

In another embodiment XML schema corresponding to deviceType attribute may be as follows:
<xs:attribute name="deviceType" type="xs:boolean" minOccurs="1"/>

In one embodiment JSON schema corresponding to deviceType element may be as follows:

```
{
    "id": "http://atsc.org/version/3.0/ur/ur_deviceType#",
    "$schema": "http://json-schema.org/draft-04/schema#",
    "title": "ATSC device type for consumption data message",
    "description": "device type indication in consumption data message ",
    "type": "object",
    "properties": {
    "required": ["CDM"],
    "CDM": {
        "type": "object",
        "properties": {
            "deviceType": {
                "type": "boolean"
            }
        }
    },
    "required": ["deviceType"]
    "additionalProperties": false },
    "maxProperties": 1
    }
}
```

Referring to FIG. 9, one technique to indicate if the content is consumed on a primary device or a companion device is using an integer/unsigned byte data type for the device type indication. This can allow device types other than primary device and companion device to be indicated in future using the device type indication reserved values.

For example, a deviceType value of 0 indicates content is presented on primary device. For example, a deviceType value of 1 indicates the content is presented on companion device. Values 2 to 255 may be reserved.

In one embodiment the deviceType maybe a sub-element or attribute of an element of CDM element illustrated in FIG. 5. In one embodiment the deviceType may be an attribute of ViewInterval element illustrated in FIG. 5.

In one embodiment XML schema corresponding to deviceType element may be as follows:

<xs:element name="deviceType" type="xs:unsignedByte" minOccurs="1"/>

In another embodiment XML schema corresponding to deviceType attribute may be as follows:

<xs:attribute name="deviceType" type="xs:unsignedByte" minOccurs="1"/>

In one embodiment JSON schema corresponding to deviceType element may be as shown below:

```
{
    "id": "http://atsc.org/version/3.0/ur/ur_deviceType#",
    "$schema": "http://json-schema.org/draft-04/schema#",
    "title": "ATSC device type for consumption data message",
    "description": "device type indication in consumption data message",
    "type": "object",
    "properties": {
```

-continued

```
        "required": ["CDM"],
        "CDM": {
            "type": "object",
            "properties": {
                "deviceType": {
                    "type": "integer"
                }
            }
        },
        "required": ["deviceType"]
        "additionalProperties": false },
        "maxProperties": 1
    }
}
```

In one embodiment instead of "type": "integer", "type": "number" may be used.

Referring to FIG. 10, one technique to indicate if the content is consumed on a primary device or a companion device also includes time interval information with the device type indication.

A DeviceType 900 indicates a device type for the content presentation.

For example, a dev 910 with a value of 0 indicates content is presented on primary device. For example, a dev 910 with a value of 1 indicates the content is presented on companion device.

A startTime 920 includes a dateTime computed from the UTC seconds count at the beginning of the event. An interval may begin when display/presentation/consumption of the content begins on the device indicated by the value of dev attribute. The value may not be less than the value of startTime 532 of this ViewInterval 530 instance. This ViewInterval 530 instance may be the parent of this Component element.

An endTime 930 includes a dateTime computed from the UTC seconds count at the end of the event. An interval may end when display/presentation/consumption of the content ends on the device indicated by the value of dev attribute. The value may not be greater than the value of endTime 534 of this ViewInterval 530 instance. This ViewInterval 530 instance may be the parent of this Component element.

In one embodiment the DeviceType maybe a sub-element of CDM element illustrated in FIG. 5. In one embodiment the DeviceType may be a sub-element of ViewInterval element illustrated in FIG. 5.

In one embodiment XML schema corresponding to deviceType element may be as follows:

```
<xs:element name="Devicetype" minOccurs="0"
maxOccurs="unbounded">
    <xs:complexType>
        <xs:attribute name="dev" type="xs:unsignedByte"
        use="required"/>
        <xs:attribute name="startTime" type="xs:dateTime"
use="required"/>
        <xs:attribute name="endTime" type="xs:dateTime"
use="required"/>
    </xs:complexType>
</xs:element>
```

In one embodiment JSON schema corresponding to DeviceType element may be as shown below:

```
{
    "id": "http://atsc.org/version/3.0/ur/ur_deviceType#",
    "$schema": "http://json-schema.org/draft-04/schema#",
    "title": "ATSC device type for consumption data message",,
```

-continued

```
    "description": "device type indication in consumption data
message",
    "type": "object",
    "properties": {
    "required": ["DeviceType"],
    "DeviceType": {
        "type": "object",
        "properties": {
            "dev": {
                "type": "integer"
            },
    "startTime": {
                "type": "date-time"
            },
    "endTime": {
                "type": "date-time"
            }
        }
    },
    "required": ["dev","startTime","endTime"]
    "additionalProperties": false },
    "maxProperties": 1
    }
}
```

In an alternative embodiment, information about the device type on which content is viewed may be indicated by extending the usage type field (e.g. @usageType illustrated in FIG. 5). In this embodiment instead of or in addition to indication of device type the content is being consumed on, the usage type field as illustrated in FIG. 5 may be extended. The usage type (attribute @ usageType) has defined values which allow indication of usage of content on main screen (no picture in picture), content on main screen with picture in picture activated with no change in main frame size, content on the small picture in picture, and/or user caused content to be rendered in less than full frame of the device.

In some cases, a viewer is watching main content or associated content on a companion device. As a result following usage types may be included, if desired: Main content (same as content on primary device) on companion device; Alternative content on companion device.

In one embodiment these could be defined values as follows. This may be done by adding these in semantics of (@usageType as illustrated in FIG. 5)
5—Main content (same as content on primary device) on companion device
6—Alternative content on companion device
In another embodiment other values may be assigned to the above usage types.

It was determined that the system should enable service usage measurement and reporting for the delivery path and/or distribution path that content is being consumed on within a given service. In this manner, more particularized information may be provided to the data server, which identifies a particular delivery path and/or distribution path of audio-visual content (including data, applications) that are selected or otherwise used by the viewer. In particular, this permits an indication of the delivery path and/or distribution path for which the usage report is reported. In addition, it is also desirable to indicate whether the delivery path and/or distribution path refers to a primary device and/or a companion device. The path may be broadband and/or wireless connectivity for the content being used, which may change during the usage of such content. As an example a receiver may receive video component via broadcast network. At some point in time due to for example weather change the broadcast signal may waken and the receiver may switch to getting the video component via broadband network. When the broadcast signal becomes strong again, the receiver may switch back to getting the video component from the broadcast network. In another use case the receiver may be getting a video component via broadcast network and getting audio component in a alternative language via broadband network. Moreover, the usage reporting may be related to 'real-time' consumption, time-shifted consumption, and/or on-demand consumption.

Referring to FIG. 11, a "deliveryPath" indicator element may be included. For example, the "deliveryPath" indicator element may be a Boolean data type For example, a deliveryPath with a value of 0 indicates terrestrial broadcast delivery. For example, a deliveryPath with a value of 1 indicates broadband delivery. Other name such as "broadcast delivery" or "broadcast network" may be used instead of "terrestrial broadcast delivery".

In one embodiment the deliveryPath attribute may be an attribute of ViewInterval element as illustrated in FIG. 5.

In one embodiment the deliveryPath maybe a sub-element or attribute of an element of CDM element as illustrated in FIG. 5.

In one embodiment XML schema corresponding to deliveryPath element may be as shown below:
<xs:element name="deliveryPath" type="xs:boolean" minOccurs="1"/>

In one embodiment XML schema corresponding to deliveryPath attribute may be as shown below:
<xs:attribute name="deliveryPath" type="xs:boolean" minOccurs="1"/>

In one embodiment JSON schema corresponding to deliveryPath element may be as follows:

```
{
    "id": "http://atsc.org/version/3.0/ur/ur_deliveryPath#",
    "$schema": "http://json-schema.org/draft-04/schema#",
    "title": "ATSC delivery path for consumption data message",
    "description": "Delivery path indication in consumption data message",
    "type": "object",
    "properties": {
    "required": ["CDM"],
    "CDM": {
        "type": "object",
        "properties": {
            "deliveryPath": {
                "type": "boolean"
            }
        }
    }
    },
    "required": ["deliveryPath"]
    "additionalProperties": false },
    "maxProperties": 1
    }
}
```

Referring to FIG. 12, one technique to indicate delivery path is using an integer/unsigned byte data type for the delivery path indication. This can allow delivery paths other than terrestrial broadcast delivery and broadband delivery to be indicated in future using the device type indication reserved values.

For example, a deliveryPath with a value of 0 indicates terrestrial broadcast delivery. For example, a deliveryPath value of 1 indicates broadband delivery. For example, a deliveryPath value of 2 indicates local delivery on home network. For example, a deliveryPath value of 3 to 255 may be reserved.

In an alternative embodiment, a deliveryPath with a value of 2 indicates delivery (of continuous component) from a primary device (PD) to companion device (CD) on a network.

In one embodiment the deliveryPath attribute may be an attribute of ViewInterval element as illustrated in FIG. 5.

In one embodiment the deliveryPath maybe a sub-element or attribute of an element of CDM element as illustrated in FIG. 5.

In one embodiment XML schema corresponding to deliveryPath element may be as shown below:
<xs:element name="deliveryPath" type="xs:unsignedByte" minOccurs="1"/>

In one embodiment XML schema corresponding to deliveryPath attribute may be as shown below:
<xs:attribute name="deliveryPath" type="xs:unsignedByte" minOccurs="1"/>

In one embodiment JSON schema corresponding to deliveryPath element may be as shown below:

```
{
    "id": "http://atsc.org/version/3.0/ur/ur_deliveryPath#",
    "$schema": "http://json-schema.org/draft-04/schema#",
    "title": "ATSC delivery path for consumption data message",
    "description": "Delivery path indication in consumption data message",
    "type": "object",
    "properties": {
    "required": ["CDM"],
    "CDM": {
        "type": "object",
        "properties": {
            "deliveryPath": {
                "type": "unsignedByte"
            }
        }
    }
    },
    "required": ["deliveryPath"]
    "additionalProperties": false },
    "maxProperties": 1
}
```

Referring to FIG. 13, one technique for the delivery path indication may include time interval information with the delivery path indication. Since the delivery path may change during a view interval (viewInterval element as illustrated in FIG. 5), the time interval information may be indicated as this may be beneficial in knowing component hand off.

The DeliveryPath 1200 may be used for the content.

For example, the pathType 1210 with a value of 0 indicates terrestrial broadcast delivery. For example, the pathType 1210 with a value of 1 indicates broadband delivery. For example, the pathType 1210 with a value of 2 indicates local delivery on the network. For example, the pathType 1210 values of 3 to 255 are reserved.

In an alternative embodiment, the pathType value of 2 indicates delivery (of continuous component) from a primary device (PD) to companion device (CD) on home network.

A startTime 1220 with a dateTime is computed from the UTC seconds count at the beginning of the event. An interval may begin when the delivery of content begins on the path indicated by the value of pathType attribute. The value may not be less than the value of startTime attribute of this ViewInterval instance.

An endTime 1230 with a dateTime computed from the UTC seconds count at the beginning of the event. An interval may end when the delivery of content ends on the path indicated by the value of pathType attribute. The value may not be greater than the value of endTime attribute of this ViewInterval instance.

In one embodiment the DeliveryPath a sub-element of ViewInterval element as illustrated in FIG. 5.

In one embodiment the DeliveryPath maybe a sub-element of CDM element as illustrated in FIG. 5.

In one embodiment XML schema corresponding to deviceType element may be as shown below:

```
<xs:element name="DeliveryPath" minOccurs="0"
maxOccurs="unbounded">
    <xs:complexType>
        <xs:attribute name="pathType" type="xs:unsignedByte"
        use="required"/>
        <xs:attribute name="startTime" type="xs:dateTime"
        use="required"/>
        <xs:attribute name="endTime" type="xs:dateTime" use="required"/>
    </xs:complexType>
</xs:element>
```

In one embodiment JSON schema corresponding to DeliveryPath element may be as shown below:

```
{
        "id": "http://atsc.org/version/3.0/ur_DeliveryPath#",
        "$schema": "http://json-schema.org/draft-04/schema#",
        "title": "ATSC delivery path for consumption data message",,
        "description": "Delivery path indication in consumption
        data message",
        "type": "object",
        "properties": {
        "required": ["DeliveryPath"],
        "DeliveryPath": {
            "type": "object",
            "properties": {
                "pathType": {
                    "type": "integer"
                },
    "startTime": {
                    "type": "date-time"
                },
    "endTime": {
                    "type": "date-time"
                }
}
        },
            "required": ["pathType","startTime","endTime"]
            "additionalProperties": false },
            "maxProperties": 1
        }
}
```

Referring to FIG. 14, in an additional embodiment the component usage report information may be further augmented by inclusion of delivery path for each component. In this manner, it is easier to identify when different components are delivered using different paths. In one case this may be indicated as shown below.

A component 1300 type, role, name, ID and time interval information.

A componentType 1305 type of component is indicated as follows:

A componentType 1305 with a value of 0 indicates an audio component.

A componentType 1305 with a value of 1 indicates a video component.

A componentType 1305 with a value of 2 indicated a closed caption component.

A componentType 1305 with a value of 3 indicates an application component.

A componentType 1305 with a value of 4 indicates a metadata component.

A componentType 1305 with values 5 to 255 are reserved.

A componentRole 1310 may be a string representing the role or kind of the component.

A componentName 1315 may be a string representing the human readable name of the component.

A componentId 1320 may be a string representing component identifier.

In some embodiments this might be a URL which identifies a component.

A startTime 1325 may be a dateTime computed from the UTC seconds count at the beginning of the event. An interval may begin when display of this content component begins. The value may not be less than the value of startTime of this ViewInterval instance. This ViewInterval 530 instance may be the parent of this Component element.

An endTime 1330 may be a dateTime computed from the UTC seconds count at the end of the event. An interval may end when display of this content component ends. The value may not be greater than the value of endTime of this ViewInterval instance. This ViewInterval 530 instance may be the parent of this Component element.

A DeliveryPath 1335 may be used for the content component indicated by the parent Component element.

For example, a pathType 1340 may be a value of 0 indicates terrestrial broadcast delivery for the content component. For example, a pathType 1340 may be a value of 1 indicates broadband delivery for the content component. For example, a pathType 1340 may be a value of 2 indicates local delivery on network for the content component. For example, a pathType 1340 may be a value of 3 to 255, are reserved.

In an alternative embodiment, a pathType 1340 may be a value of 2 may indicate delivery (of this continuous component) from a primary device (PD) to companion device (CD) on a network.

A startTime 1345 may be a dateTime computed from the UTC seconds count at the beginning of the event. An interval may begin when the delivery of content component begins on the path indicated by the value of pathType attribute. The value may not be less than the value of startTime attribute of the parent Component element. In an alternative embodiment: A startTime 1345 may be a dateTime computed from the UTC seconds count at the beginning of the event. An interval may begin when the delivery of content component begins on the path indicated by the value of pathType attribute. The value may not be less than the value of startTime attribute of this ViewInterval instance.

An endTime 1350 may be a dateTime computed from the UTC seconds count at the beginning of the event. An interval may end when the delivery of content component ends on the path indicated by the value of pathType attribute. The value may not be greater than the value of endTime attribute of the parent Component element. In an alternative embodiment: An endTime 1350 may be a dateTime computed from the UTC seconds count at the beginning of the event. An interval may end when the delivery of content component ends on the path indicated by the value of pathType attribute. The value may not be greater than the value of endTime attribute of this ViewInterval instance.

In one embodiment the Component element may be a sub-element of ViewInterval element as illustrated in FIG. 5.

The consumption data message is defined as a fundamental data structure used to transmit CDUs from a service usage data client to a service usage data server. A consumption data message may be formatted as Javascript Object Notation (JSON) data instead of as XML data which tends to be more suitable for low bandwidth networks. A URCR may transmit a Consumption Data Message (CDM) to service usage data server as JSON data as per a defined JSON schema.

Additional embodiments are described further below.

Modifications and extensions of the ATSC A105 Consumption data message for service usage reporting are described further. FIG. 15 shows a logical structure of extended consumption data message (CDM).

With respect to FIG. 15 the additional elements compared to A105 and their semantics are as described below.

Semantics for other elements and attributes as specified below apply.

deviceType: Value of 0 indicates content is presented on a primary device. Value of 1 indicates the content is presented on a companion device. Values 2 to 255 are reserved.

Component: Content component type, role, name, ID and time interval information.

componentType: The type of component is indicated. Value of 0 indicates an audio component. Value of 1 indicates a video component. Value of 2 indicated a closed caption component. Value of 3 indicates an application component. Values 4 to 255 are reserved.

componentRole: A unsigned byte representing the role or kind of the component. In this case the componentRole attribute will be interpreted as follows: For audio component (when componentType value above is equal to 0) values of componentRole are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For Video (when componentType value above is equal to 1) values of componentRole are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType value above is equal to 2) values of componentRole are as follows: 0=Normal, 1=Easy reader, 2-254=reserved, 255=unknown.

When componentType value above is between 3 to 255, inclusive, the componentRole may be equal to 255.

componentName: A string representing the human readable name of the component.

componentId: A string representing component identifier.

startTime: the dateTime computed from the UTC seconds count at the beginning of the event. Interval may begin when display of this content component begins. The value may not be less than the value of startTime attribute of this ViewInterval instance.

endTime: the dateTime computed from the UTC seconds count at the end of the event. Interval may end when display of this content component ends. The value may not be greater than the value of endTime attribute of this ViewInterval instance.

DeliveryPath: Delivery path used for the content component indicated by the parent Component element.

pathType: Value of 0 indicates terrestrial broadcast delivery for the content component. Value of 1 indicates broadband delivery for the content component. Value of 2 indicates local delivery on home network for the content component. Values 3 to 254 are reserved. Value of 255 indicates unknown delivery path.

startTime: the dateTime computed from the UTC seconds count at the beginning of the event. Interval may begin when the delivery of content component begins on the path indicated by the value of pathType attribute. The value may not be less than the value of startTime attribute of the parent Component element.

endTime: the dateTime computed from the UTC seconds count at the beginning of the event. Interval may end when the delivery of content component ends on the path indicated by the value of pathType attribute. The value may not be greater than the value of endTime attribute of the parent Component element.

In a variant embodiment the componentRole attribute may use data type of String instead of unsigned byte.

| @componentRole | 1 | String | Role of the component |
|---|---|---|---|

In this case the role of the component will be described in String form. Possible String values are described below.

For audio component (when componentType value is equal to 0) allowed values of componentRole are as follows:
"Complete main"
"Music and Effects"
"Dialog"
"Commentary"
"Visually Impaired"
"Hearing Impaired"
"Voice-Over"
"reserved"
"unknown"

For Video (when componentType field above is equal to 1) allowed values of corn-ponentRole are as follows:
"Primary video"
"Alternative camera view"
"Other alternative video component"
"Sign language inset"
"Follow subject video"
"3D video left view"
"3D video right view"
"3D video depth information"
"Part of video array <x,y> of <n,m>"
"Follow-Subject metadata"
"reserved"
"unknown"

For Closed Caption component (when componentType field above is equal to 2) allowed values of componentRole are as follows:
"Normal"
"Easy reader,"
"reserved,"
"unknown"

In a variant embodiment the pathType attribute may use data type of String instead of unsigned byte.

| @pathType | 1 | String | Type of delivery path used for the content component being consumed |
|---|---|---|---|

In this case the type of delivery path used for the content component being consumed will be described in String form. Possible String values are described below.

The allowed values for deliveryPath are as follows:
"broadcast" (indicates terrestrial broadcast delivery for the content component)
"broadband" (indicates broadband delivery for the content component).
"local" (indicates local delivery on home network for the content component.)

"reserved",
"unknown" (indicates unknown delivery path).

In this case JSON schema part for pathType may use enumerations as shown below:

```
"properties":{
        "pathType":{
                "enum": [ "broadcast", "broadband", "local",
"application", "reserved", "unknown"]
        }
}
```

In yet another embodiment the pathType may use a data type of String without enumerations. In this case JSON schema part for pathType is as shown below:

```
        "properties":{
                        "pathType": {
                                "type": "string"
                        }
        }
```

JSON schema is described for existing A/105 elements and attributes for service usage report consumption data messages (CDMs). JSON schema is also described for the proposed extensions of A/105 for service usage reporting. In the prior art XML is used for CDMs. It is noted that JSON schema does not allow attributes thus re-definition of various attributes for incorporation into JSON schema. An exemplary JSON schema is shown in FIGS. 16A to 16D.

In an alternative embodiment. componentType and componentRole may be described in JSON schema using enumerations as shown below:

```
"properties":{
                        "componentType":{
                                "enum": [ "audio", "video", "closed caption",
"application",   "metadata",       "unknown",         "reserved"]
                        },
                        "componentRole":{
                                "enum": [ "Complete main", "Music and
Effects", "Dialog", "Commentary", "Visually Impaired", "Hearing
Impaired", "Voice-Over", "Primary video", "Alternative camera view", "Other
alternative video component", "Sign language inset", "Follow subject video", "3D
video left view", "3D video right view", "3D video depth information", "Part of
video array <x.y> of <n.m>", "Follow-Subject metadata", "Normal", "Easy reader" ]
                        }
}
```

In yet another embodiment XML schema may be used to represent the consumption data messages and/or service usage report.

In this case the component usage report information may be further augmented by inclusion of delivery path for each component. XML schema for the combination of component indication and delivery path indication is as shown in FIG. 17.

The overall XML schema including the proposed extensions is shown in FIGS. 18A to 18C.

In certain systems it may be beneficial for the service usage data server to receive information about the consumption device. This includes consumption device information such as device identifier, model, manufacturer, operating system, and an indication if the device is an external peripheral. Acquiring and using such information may allow the server to understand the consumption device capability and to mine this data to provide personalization based on the consumption device. The term consumption device and device may be used interchangeably.

Elements and sub-elements are described along with their syntax and semantics for providing consumption device information in a service usage report.

FIG. 19 shows a logical structure of the device information including various elements. The semantics of the elements may be as follows:

DeviceInfo—The consumption device information.

DeviceInfo.deviceID—A field that, when present, may identify the consumption device identifier. A value of "PRIVATE" indicates the consumption device identifier is intentionally not revealed.

DeviceInfo.deviceModel—A field that, when present, may identify the consumption device model (e.g. XYZ-NG3400). A value of "PRIVATE" indicates the consumption device model is intentionally not revealed.

DeviceInfo.deviceManufacturer—A field that, when present, may identify the consumption device manufacturer (e.g. ABC company). A value of "PRIVATE" indicates the consumption device manufacturer is intentionally not revealed.

DeviceInfo.deviceOS—A field that, when present, may identify the consumption device operating system and version (e.g. iOS 9.0.2, Android 5.0.1). A value of "PRIVATE" indicates the consumption device operating system is intentionally not revealed.

DeviceInfo.peripheralDevice—A field that, when present, may identify if the consumption device is an external peripheral (e.g. a ATSC tuner dongle). A value of "PRIVATE" indicates that it is intentionally not revealed if the consumption device is external peripheral or not.

As described above in the semantics, a special value is defined for various device sub-elements (value "PRIVATE"), which allows a user to selectively opt-out of providing the consumption device information in a service usage report. The semantics and schema is defined to explicitly allow service usage data server to distinguish between a deliberate opt-out in contrast to unknown consumption device information. In a variant example some other special value e.g. value "0" or "OPT-OUT" or "UNRECOGNIZEd" may be used instead of value "PRIVATE".

An exemplary JSON schema for the device information is shown in FIG. 20.

Figure 22:
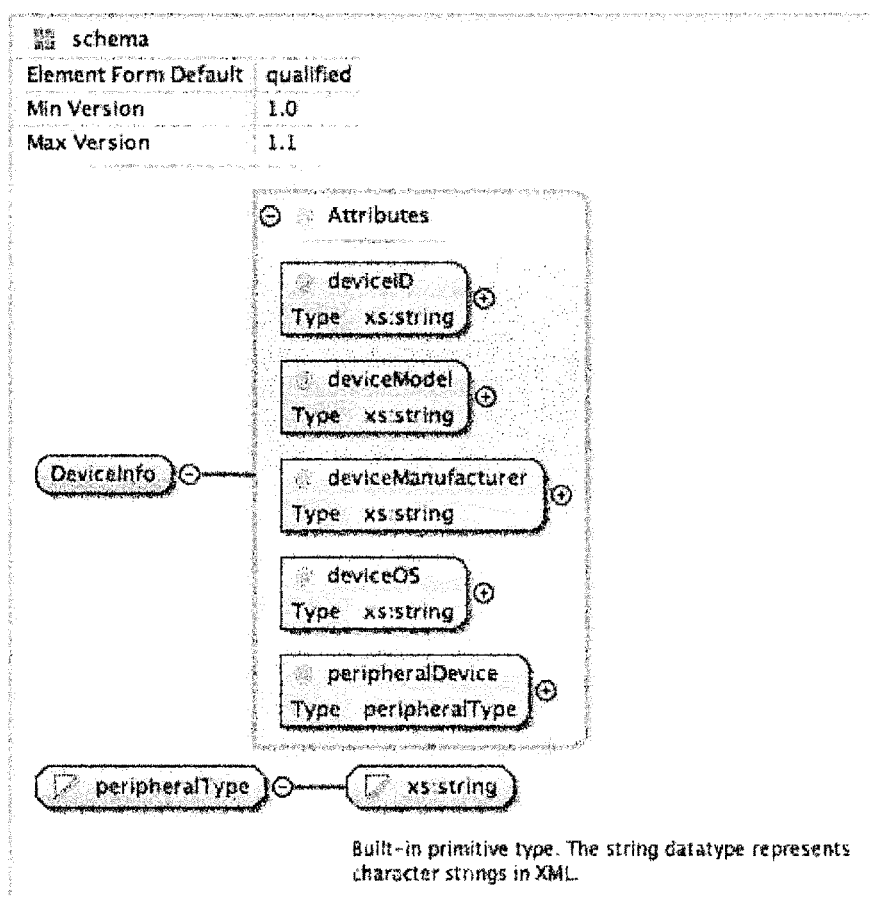
FIG. 22 illustrates structure of device information elements and attributes.

An exemplary XML schema for the device information is shown in FIG. 21. FIG. 22 illustrates structure of the device information elements and attributes. The structure shown in FIG. 22 may correspond with XML schema of FIG. 21, but it is also ap-plicable to FIG. 20 with attributes replaced by sub-elements or properties.

The schema in FIG. 20 and FIG. 21 corresponds with device information logical structure shown in FIG. 19.

The device information elements are included in the service usage report. Device information may be signalled in a Consumption Data Message.

The elements and sub-elements from FIG. 19 may be added to the consumption data message structure.

Since the device information is typically expected to be relatively static it may be efficient to signal it inside the Consumption Data Message outside the loops, which provides service usage reporting data for the service divided in various intervals. This is because each interval may hold information for multiple components for multiple delivery paths. Sending the device information outside these loops is expected to be more bit-efficient in not repeating the same device information. FIG. 23 illustrates a logical structure of consumption data message including the device information placed at a location as mentioned above.

FIGS. 24A to 24C illustrate an exemplary JSON schema corresponding to consumption data message of FIG. 23.

With respect to FIG. 23, semantics of various elements are as follows:

protocolVersion—This field may contain the major and minor protocol versions of the syntax and semantics of the CDM.

DeviceInfo—The consumption device information.

DeviceInfo.deviceID—A field that, when present, may identify the consumption device identifier. A value of "PRIVATE" indicates the consumption device identifier is intentionally not revealed.

DeviceInfo.deviceModel—A field that, when present, may identify the consumption device model (e.g. XYZ-NG3400). A value of "PRIVATE" indicates the consumption device model is intentionally not revealed.

DeviceInfo.deviceManufacturer—A field that, when present, may identify the consumption device manufacturer (e.g. ABC company). A value of "PRIVATE" indicates the consumption device manufacturer is intentionally not revealed.

DeviceInfo.deviceOS—A field that, when present, may identify the consumption device operating system and version (e.g. iOS 9.0.2, Android 5.0.1). A value of "PRIVATE" indicates the consumption device operating system is intentionally not revealed.

DeviceInfo.peripheralDevice—A field that, when present, may identify if the consumption device is an external peripheral (e.g. a ATSC tuner dongle). A value of "PRIVATE" indicates that it is intentionally not revealed if the consumption device is external peripheral or not.

AVService—This element contains a list of zero or more elements describing activity intervals based on content delivered continuously.

serviceID—This value of this attribute may identify the service associated with the usage data in this AVChannel element.

serviceType—The value of the service type.

reportInterval—One or more periods of display of content for this channelNum.

reportInterval.startTime—The UTC dateTime at the beginning of the event. Intervals may begin when display of the content begins.

reportInterval.endTime—The UTC dateTime at the end of the event. Intervals may end when display of the content ends.

DestinationDeviceType—An unsigned integer denoting the class of usage or device type (presentation device). Defined values are:

0—Content is presented on a primary device
1—Content is presented on a companion device
2—Content is sent to a time-shift-buffer
3—Content is sent to a hard-drive
4 to 255—Reserved.

ContentID—This field may identify the content associated with this instance of reportInterval.

ContentID.type—A field that is required when ContentId element is included. Two values are defined currently: "EIDR" indicates a content identification per the EIDR registry (http://eidr.org).

"Ad-ID" indicates a content identifier per the Ad-ID registry (http://ad-id.org).

ContentID.cid—A field that is required when ContentId element is included that provides the content identification for this reportInterval element. The type of content identifier may be as given in the ContentID @ type attribute. Either an EIDR (34-character canonical form with hyphens) or Ad-ID (12-character canonical form) can be included.

Component—Content component type, role, name, ID and time interval information.

Component.componentType—The type of component is indicated. Value of 0 may indicate an audio component. Value of 1 may indicate a video component. Value of 2 may indicate a closed caption component. Value of 3 may indicate an application component. Values 4 to 255 may be reserved.

Component.componentRole—A unsigned byte that may represent the role or kind of the component. In this case the componentRole attribute may be interpreted as follows: For audio component (when componentType value above is equal to 0) values of componentRole may be as follows: 0=Complete main, 1=Music and Effects, 2=Dialog, 3=Commentary, 4=Visually Impaired, 5=Hearing Impaired, 6=Voice-Over, 7-254=reserved, 255=unknown.

For Video (when componentType value above is equal to 1) values of componentRole may be as follows: 0=Primary video, 1-254=reserved, 255=unknown.

For Closed Caption component (when componentType value above is equal to 2) values of componentRole may be as follows: 0=Normal, 1=Easy reader, 2-254=reserved, 255=unknown.

When componentType value above is between 3 to 255, inclusive, the componentRole may be equal to 255.

Component.componentName—A string representing the human-readable name of the component.

Component.componentId—A string representing a component identifier.

Component.Lang—A string representing a component language.

Component.startTime—the UTC dateTime at the beginning of the event. Interval may begin when display of this content component begins. The value may not be less than the value of startTime attribute of this reportInterval instance.

Component.endTime—the UTC dateTime at the end of the event. Interval may end when display of this content component ends. The value may not be greater than the value of endTime attribute of this reportInterval instance.

Component.SourceDeliveryPath: Delivery path used for or the source of the content component indicated by the parent Component element.

SourceDeliveryPath.type—

0—Broadcast delivery (content component is delivered by broadcast)
1—Broadband delivery (content component is delivered by broadband)
2—Time-shift-buffer source (content source is local time shift buffer)
3—Hard-drive source (content source is local hard drive)
4 to 255—Reserved.

SourceDeliveryPath.startTime—the UTC dateTime at the beginning of the event. Interval may begin when the delivery of content component begins on the path or from the source indicated by the value of type attribute. The value may not be less than the value of startTime attribute of the parent Component element.

SourceDeliveryPath.endTime—the UTC dateTime at the beginning of the event. Interval may end when the delivery of content component ends on the path or from the source indicated by the value of type attribute. The value may not be greater than the value of endTime attribute of the parent Component element.

AppInterval—The interval for each active Application.

AppInterval.appId—application identifier.

AppInterval.startTime—The UTC dateTime at the beginning of the event. Intervals may begin when display of the content begins. The value may not be less than the value of startTime of this reportInterval instance.

AppInterval.endTime—The UTC dateTime at the end of the event. Intervals may end when display of the content ends. The value may not be greater than the value of endTime of this reportInterval instance.

AppInterval.LifeCycle—An unsigned integer denoting the application lifecycle.

Defined values are:
1—Downloaded not launched
2—Downloaded and auto-launched
3—Downloaded and user-launched
4 to 99—Reserved.

AppInterval. Tags—application tag or label.

In yet another example, the device information may be signalled inside the Consumption Data Message inside the AV service but outside the loop of various intervals. This can result in further bit-savings. FIG. 25 illustrates a logical structure of consumption data message including the device information placed at a location as mentioned above.

In a further variant example, the device information may be signalled inside the loop of various intervals. This can provide the maximum flexibility in terms of providing device information—if it changes in different reporting intervals. FIG. 26 illustrates logical structure of consumption data message including the device information placed at a location as mentioned above.

JSON schema corresponding to FIG. 25 and FIG. 26 is similar to JSON schema shown in FIG. 23 except the DeviceInfo and its sub-elements or properties are moved to the location as shown in FIG. 25 and FIG. 26.

Additional variant examples for cardinality of various elements are described below.

The cardinality of some of the elements and sub-elements may be modified compared to that described above.

The cardinality of DeviceInfo may be changed from 1 to 0 . . . 1 to 0 . . . N or 0 . . . 2 or 1 . . . N.

The cardinality of deviceID may be changed from 1 to 0 . . . 1 or 0 . . . N.

The cardinality of deviceModel may be changed from 1 to 0 . . . 1 or 0 . . . N.

The cardinality of deviceManufacturer may be changed from 1 to 0 . . . 1 or 0 . . . N.

The cardinality of deviceOS may be changed from 1 to 0 . . . 1 or 0 . . . N.

The cardinality of peripheralDevice may be changed from 1 to 0 . . . 1 or 0 . . . N.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semi-conductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for providing a consumption data message from a consumption device that includes a processor to a service usage data server comprising:
   (a) providing by said processor of said consumption device the consumption data message from said consumption device to said service usage data server, wherein the consumption data message includes:
   (i) a deviceInfo element that describes a consumption device information;
   (ii) a deviceID field of said deviceInfo element that describes an identifier of said consumption device, wherein the deviceID field can have a value to indicate that said identifier of the consumption device is intentionally not revealed;
   (iii) a deviceManufacturer field of the deviceInfo element that describes a manufacturer of the consumption device, wherein the deviceManufacturer field can have a value to indicate that the manufacturer of the consumption device is intentionally not revealed;
   (iv) a deviceOS field of said deviceInfo element that describes both an operating system and a version of said operating system of said consumption device, wherein said deviceOS field can have a value to indicate said operating system of said consumption device is intentionally not revealed;
   (v) a peripheralDevice field of said deviceInfo element that describes whether said consumption device is an external peripheral, wherein said peripheralDevice field can have a value to indicate said whether said consumption device is said external peripheral is intentionally not revealed;
   (vi) an AVService element that contains the list of zero or more elements describing activity intervals based on content delivered continuously; and
   (vii) a reportInterval field of the AVService element indicates one or more periods of display of content for the AVService.

2. A method for receiving a consumption data message for a service usage data server that includes a processor from a consumption device comprising:

(a) receiving the consumption data message by said processor of said service usage data server from said consumption device, wherein the consumption data message includes:
  (i) a deviceInfo element that describes a consumption device information;
  (ii) a deviceID field of said deviceInfo element that describes an identifier of said consumption device, wherein said deviceID field can have a value to indicate said identifier of said consumption device is intentionally not revealed;
  (iii) a deviceManufacturer field of the deviceInfo element that describes a manufacturer of the consumption device, wherein the deviceManufacturer field can have a value to indicate that the manufacturer of the consumption device is intentionally not revealed;
  (iv) a deviceOS field of said deviceInfo element that describes both an operating system and a version of said operating system of said consumption device, wherein said deviceOS field can have a value to indicate said operating system of said consumption device is intentionally not revealed;
  (v) a peripheralDevice field of said deviceInfo element that describes whether said consumption device is an external peripheral, wherein said peripheralDevice field can have a value to indicate said whether said consumption device is said external peripheral is intentionally not revealed;
  (vi) an AVService element that contains the list of zero or more elements describing activity intervals based on content delivered continuously; and
  (vii) a reportinterval field of the AVService element indicates one or more periods of display of content for the AVService.

* * * * *